US008201726B2

(12) United States Patent
Scott et al.

(10) Patent No.: US 8,201,726 B2
(45) Date of Patent: Jun. 19, 2012

(54) POINT-OF-SALE PRINTER SYSTEM

(75) Inventors: Robert C. Scott, Edina, MN (US); Terrance Francis Purcell, Brooklyn Park, MN (US); Mitchell W. Knoll, Eagan, MN (US); Joseph R. Guggenberger, Elk River, MN (US)

(73) Assignee: Target Brands, Inc., Minneapolis, MN (US)

( * ) Notice: Subject to any disclaimer, the term of this patent is extended or adjusted under 35 U.S.C. 154(b) by 399 days.

(21) Appl. No.: 12/565,475

(22) Filed: Sep. 23, 2009

(65) Prior Publication Data

US 2011/0068163 A1 Mar. 24, 2011

(51) Int. Cl.
*G06F 17/00* (2006.01)

(52) U.S. Cl. .................................................. 235/375

(58) Field of Classification Search ............... D18/1–99
See application file for complete search history.

(56) References Cited

U.S. PATENT DOCUMENTS

| | | | |
|---|---|---|---|
| D257,359 S | 10/1980 | Lloyd, Jr. | |
| 4,645,275 A | 2/1987 | Pucci | |
| 4,651,967 A | 3/1987 | McCoy | |
| D290,020 S | 5/1987 | McCoy | |
| D298,637 S | 11/1988 | Sokolowski | |
| 4,880,202 A | 11/1989 | Gauss | |
| D307,084 S | 4/1990 | Currie | |
| D314,974 S | 2/1991 | Peart | |
| 5,042,762 A | 8/1991 | Kerr | |
| D403,536 S | 1/1999 | Olson et al. | |
| D415,791 S | 10/1999 | Okamura | |
| 6,377,935 B1 * | 4/2002 | Deaton et al. | 705/14.41 |
| 6,421,133 B2 | 7/2002 | Kasai et al. | |
| 6,834,596 B2 * | 12/2004 | Kerber | 108/42 |
| 6,984,057 B1 * | 1/2006 | Rogers | 362/253 |
| 7,349,202 B2 * | 3/2008 | Kano et al. | 361/679.55 |
| 2005/0109843 A1 * | 5/2005 | Dove et al. | 235/382 |
| 2008/0182224 A1 * | 7/2008 | Ahearn | 433/77 |

OTHER PUBLICATIONS

Images of Point-of-Sale Registers, publicly available in 2008, p. 1.*
Balt—DBL Dual Laser Printer Stand Product Rating, avaliable at http://www.csnofficefurniture.com/Balt-22001-BL1100.html, printed Apr. 23, 2009, 4 pages.
Balt—MaxStax Workstation Product Rating, available at http://www.csnofficefurniture.com/Balt-25983-BL1021.html, printed Apr. 23, 2009, 4 pages.
Images of Point-of-Sale Registers, publicly available in 2008, 3 pages.
LexMark MFP Adjustable Stand, . Computers4SURE, available at http://www.computers4sure.com/product.asp?productid=472961, printed Apr. 28, 2009, 1 page.
Epson, "Catalina Marketing and Epson Give Retailers Full-color Coupon Printer Power," 2006, 2 pages.

* cited by examiner

*Primary Examiner* — Thien M. Le
*Assistant Examiner* — Christle Marshall
(74) *Attorney, Agent, or Firm* — Nixon & Vanderhye P.C.

(57) ABSTRACT

Some embodiments of a point-of-sale register apparatus may include first and second printers supported by a printer stand. The printer stand may arrange the first and second printers in a vertical array so as to efficiently use the space at the point-of-sale register. In some embodiments, the vertical array of printers is positioned near a user's hands and within a user's immediate line of sight when viewing the register's display screen.

20 Claims, 24 Drawing Sheets

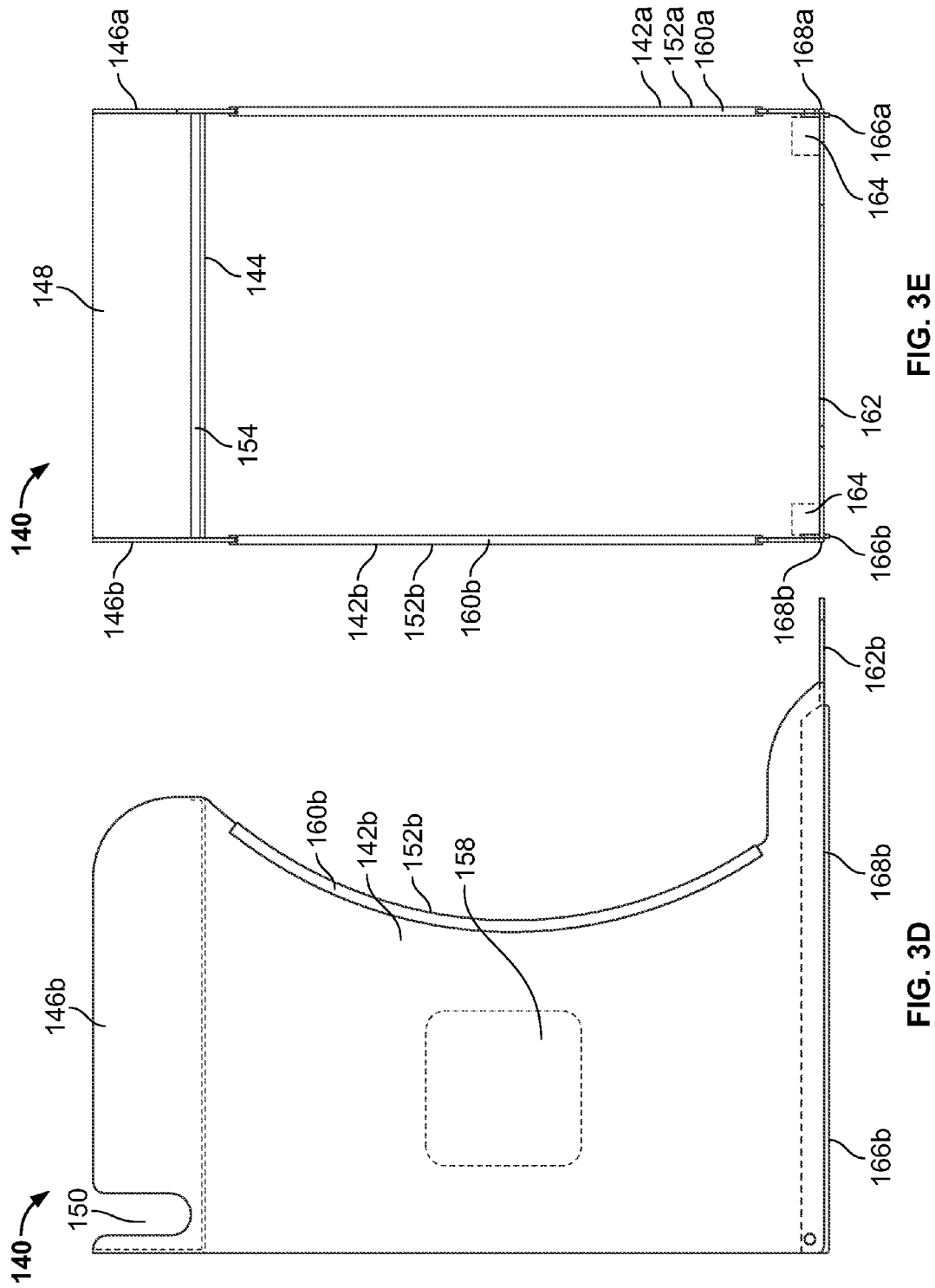

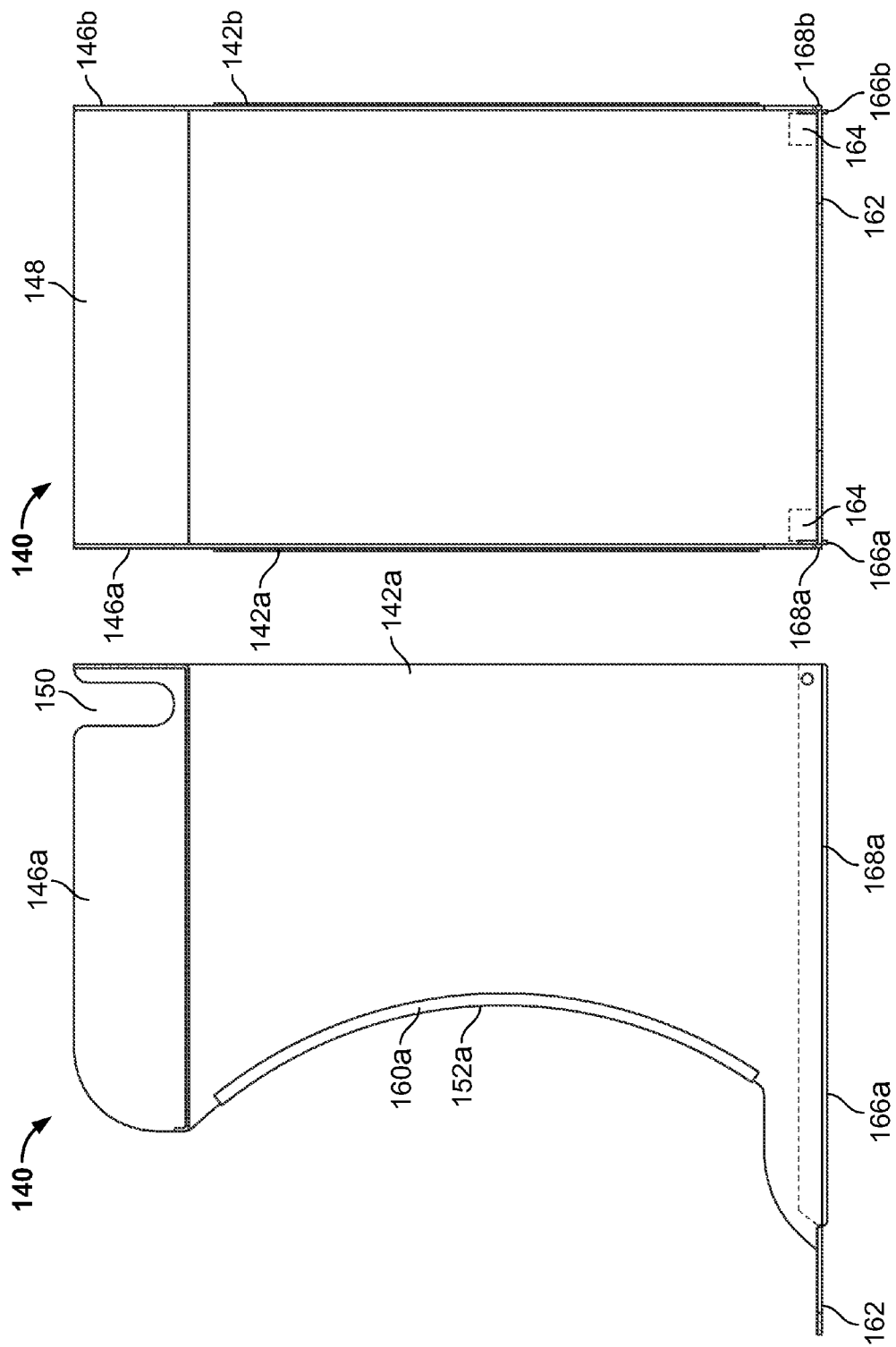

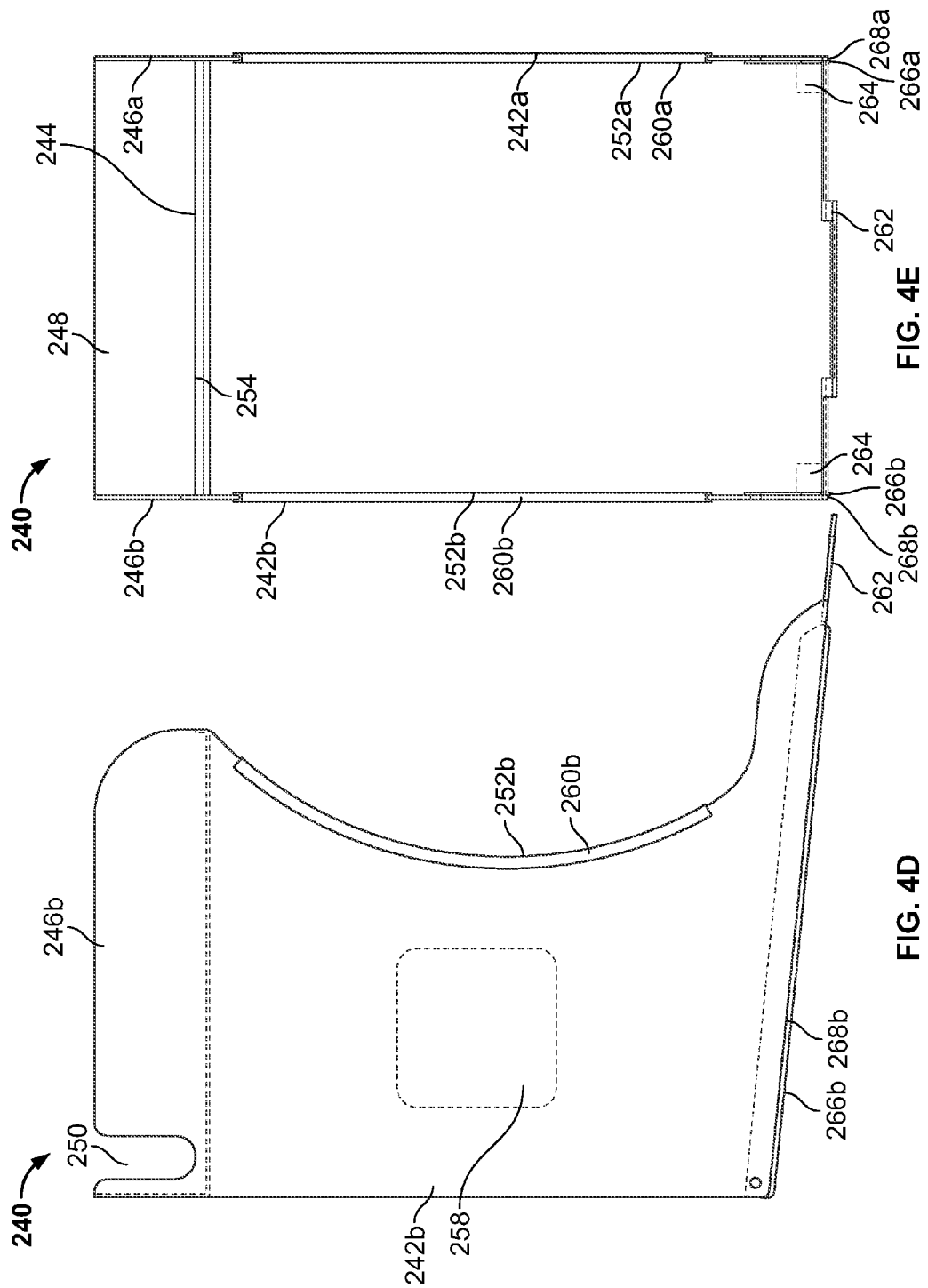

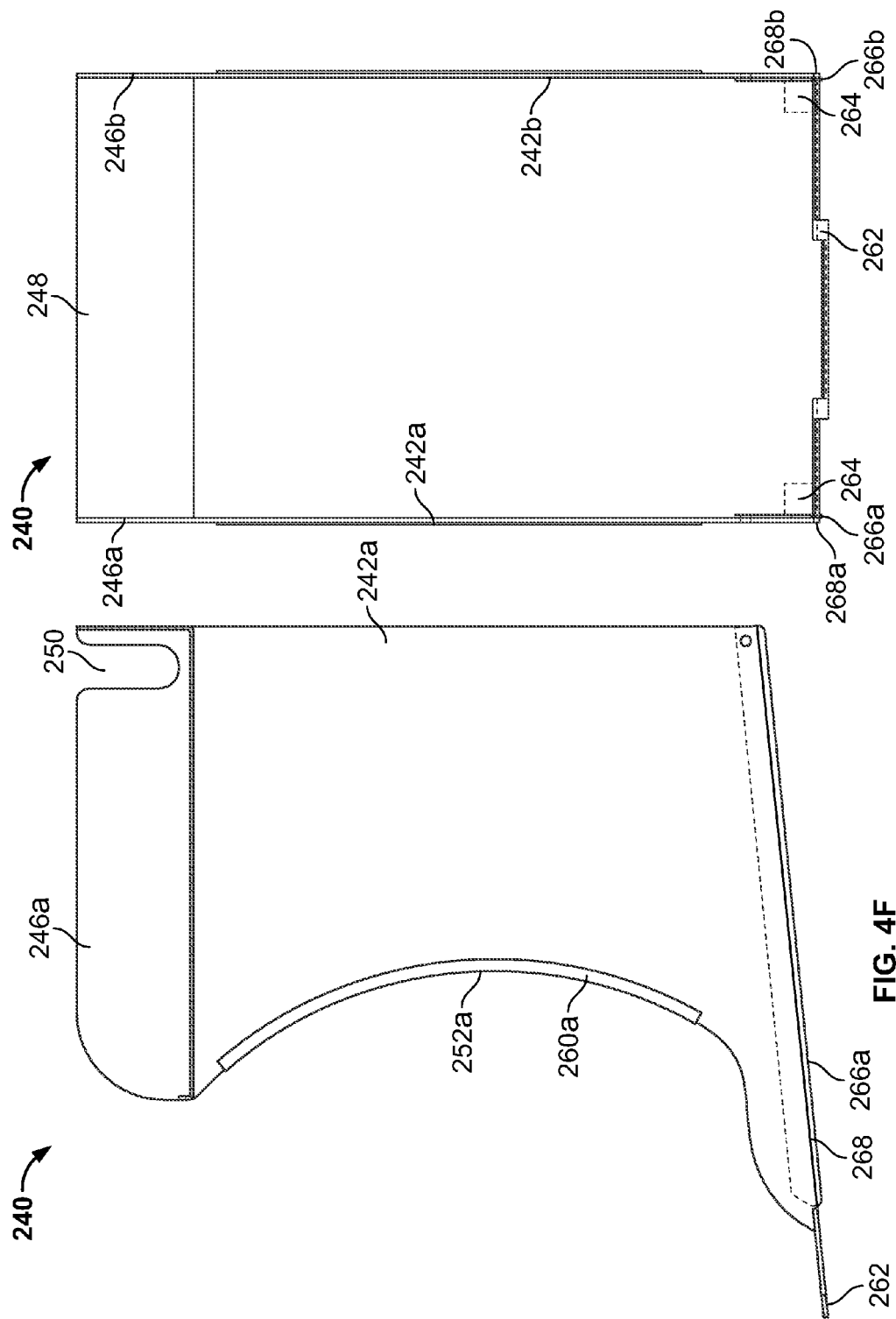

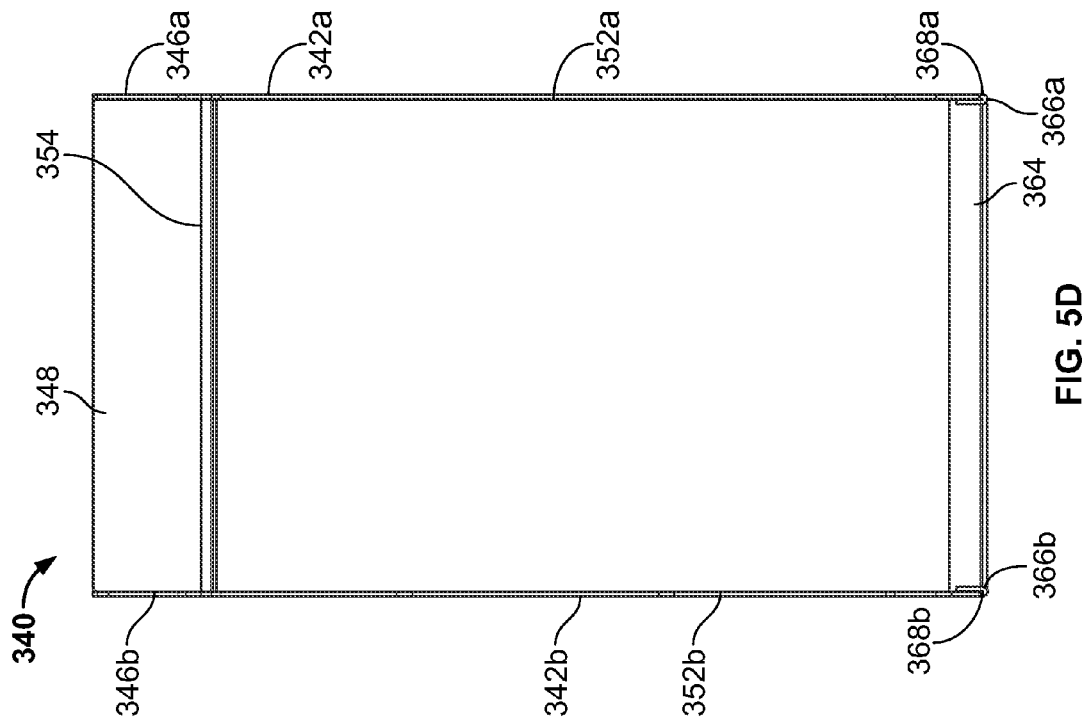
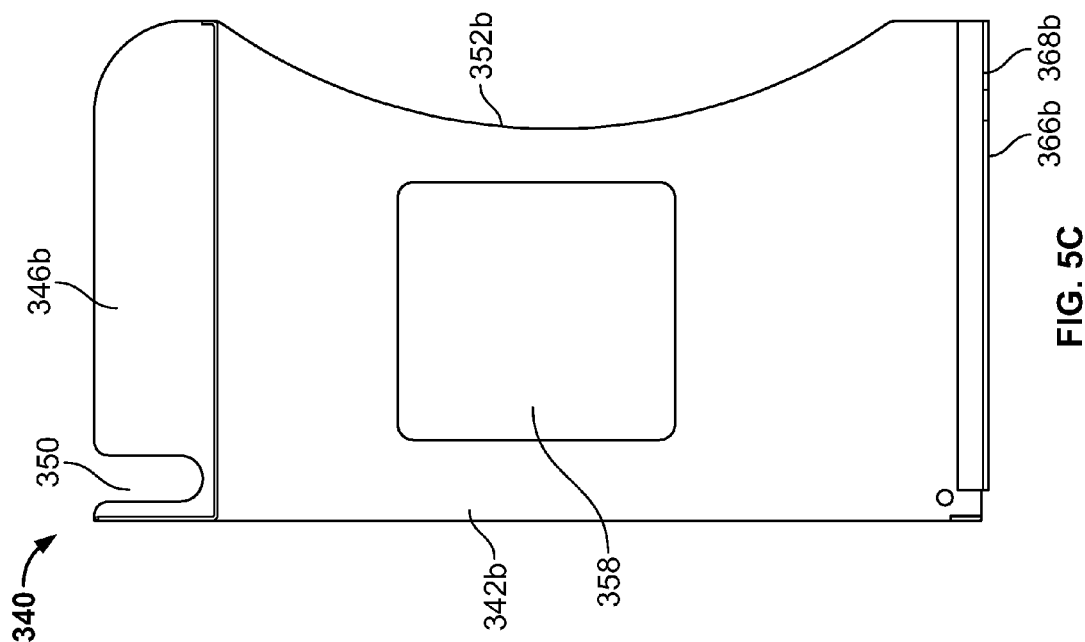
FIG. 5D
FIG. 5C

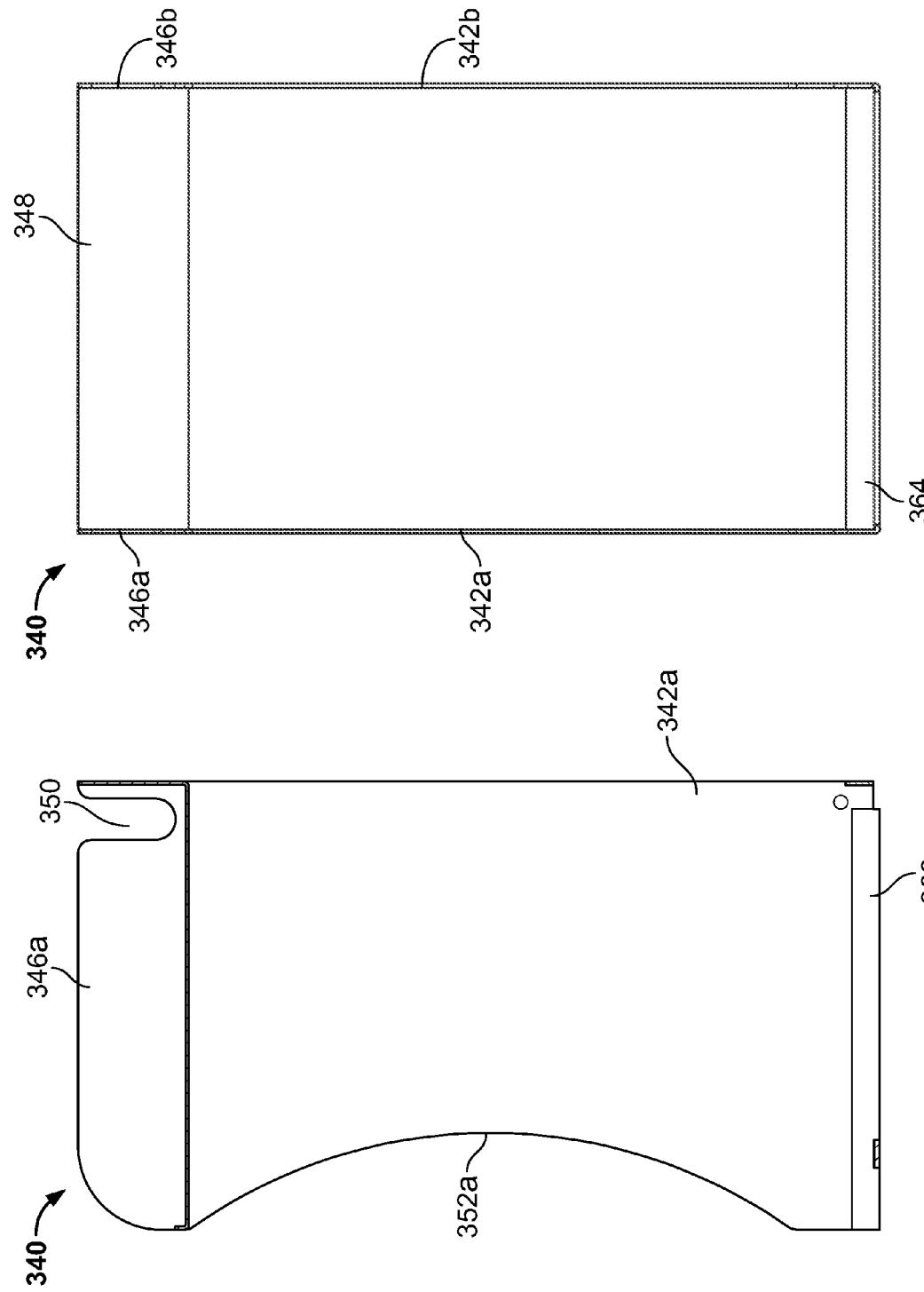

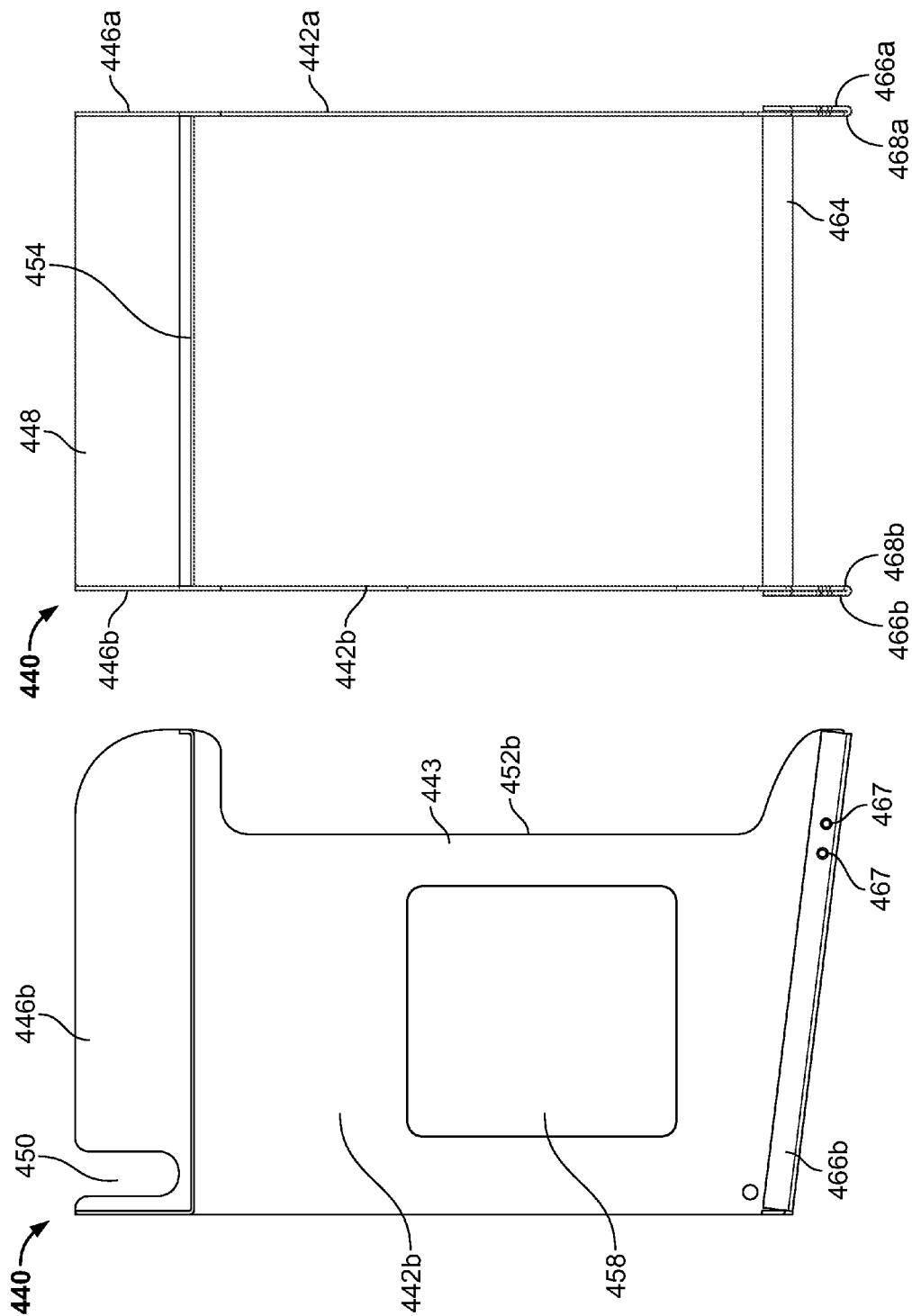

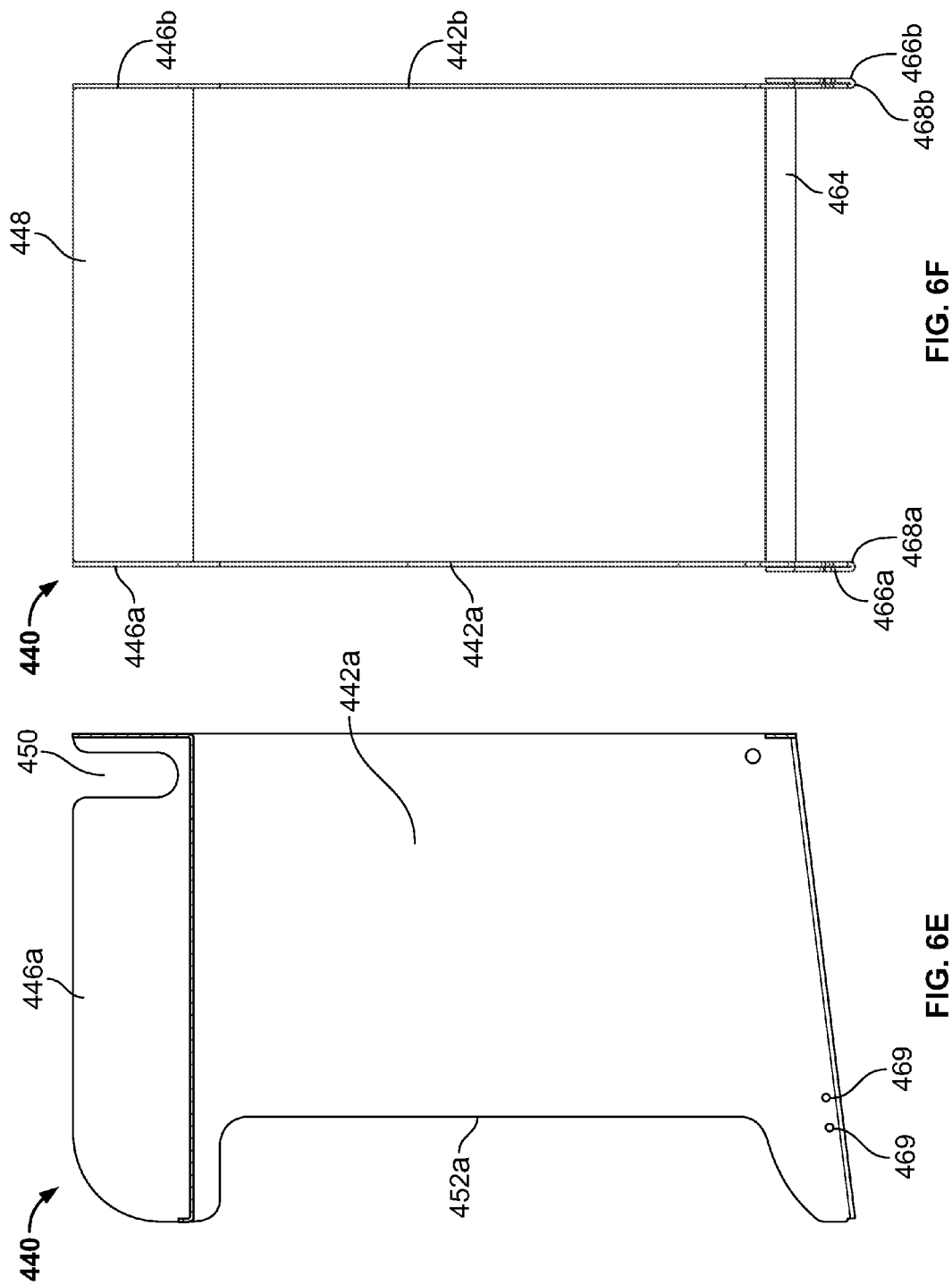

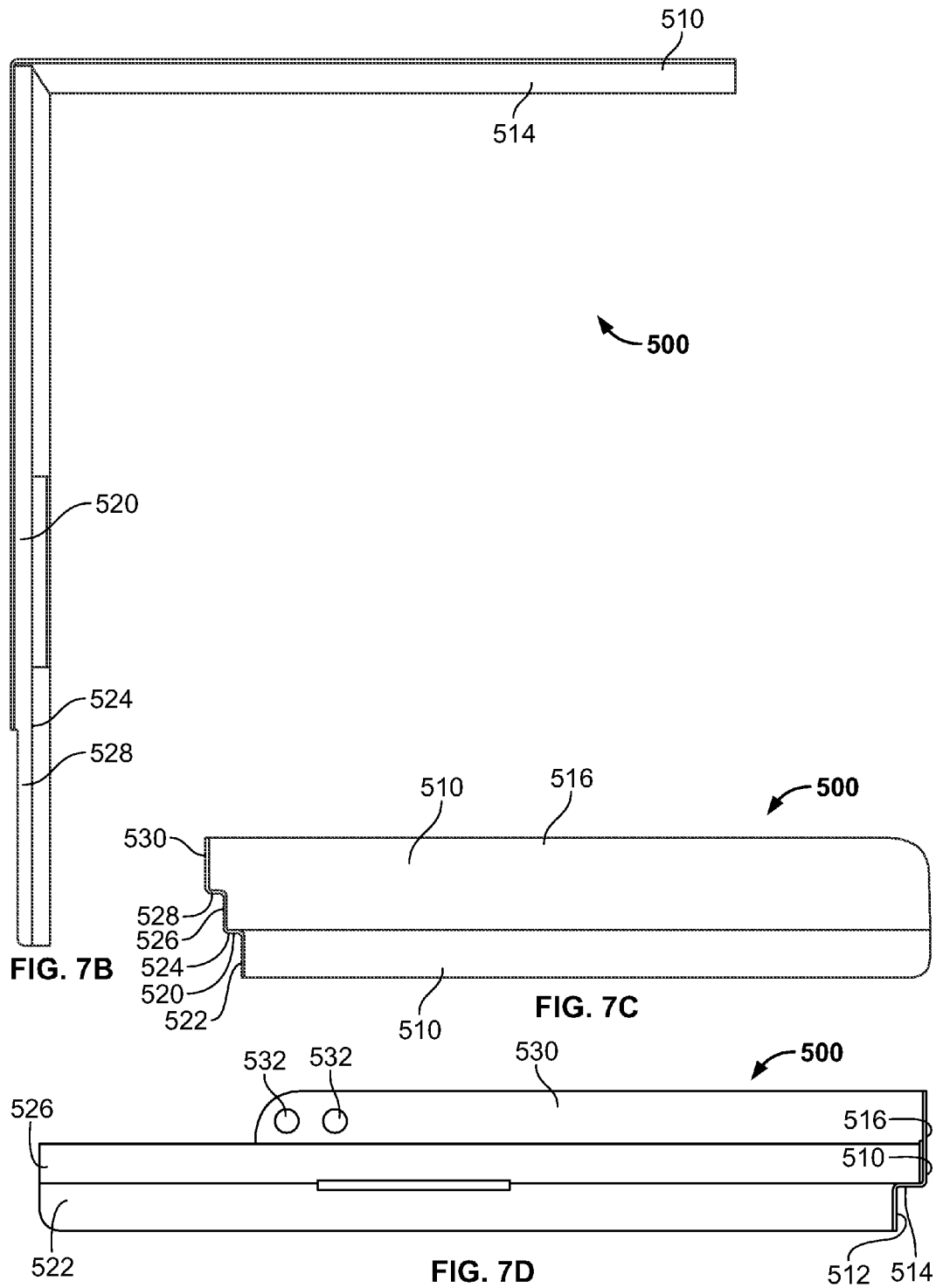

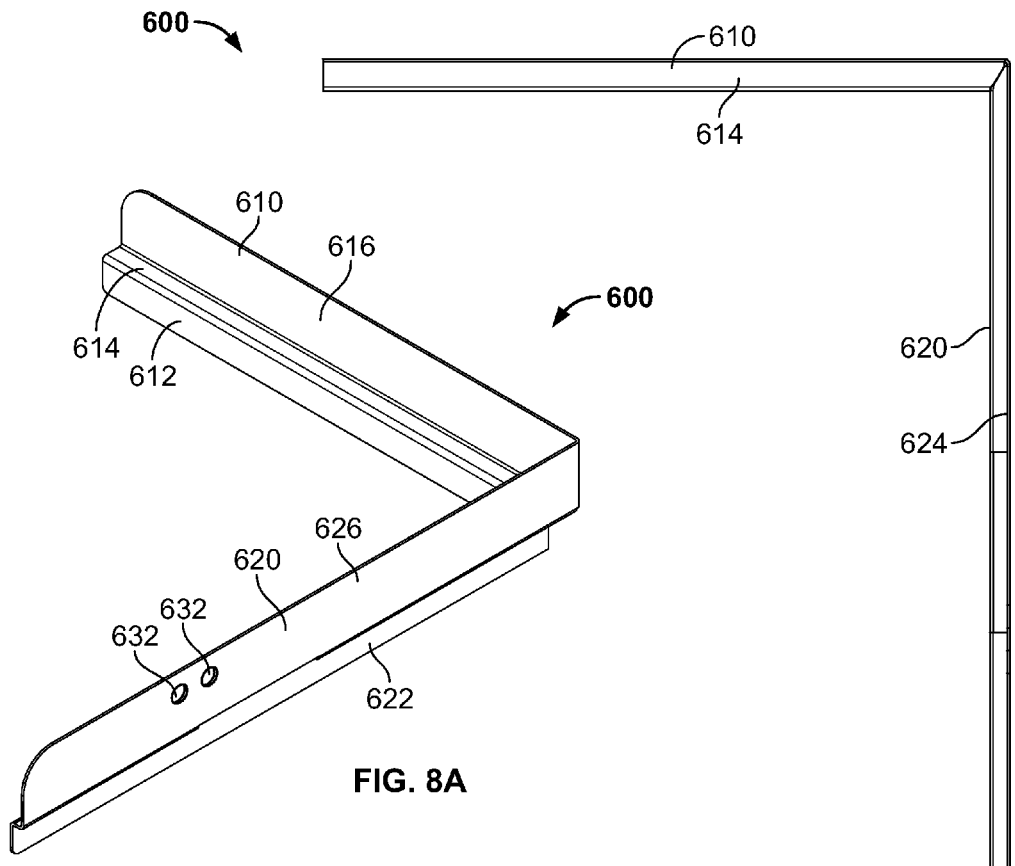
FIG. 8A
FIG. 8B
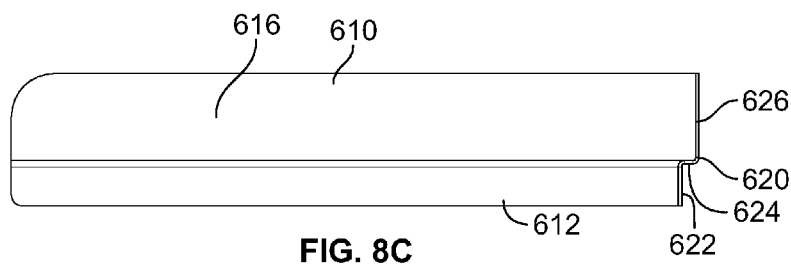
FIG. 8C
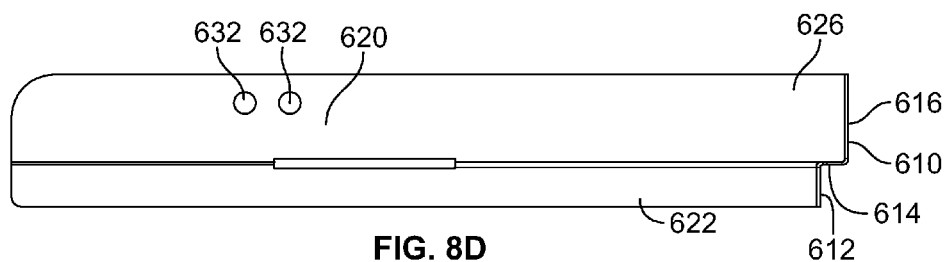
FIG. 8D

POINT-OF-SALE PRINTER SYSTEM

TECHNICAL FIELD

This disclosure relates to a point-of-sale printer system that supports one or more printers.

BACKGROUND

Retail store environments normally include one or more point-of-sale registers at which consumers may obtain receipts that record a transaction. Typically, an individual printer is arranged at the point-of-sale register to print receipts. The receipt printer is ordinarily outputs black numerals and text onto a roll of paper, such as thermal paper.

The typical point-of-sale registers may also include a scanner or other device for entering merchandise to be purchased by a consumer. The scanner may be built into a conveyor counter or may be a handheld device that is handled by a store worker during a sales transaction with a consumer.

The point-of-sale registers may also include a display screen so that a store worker can verify the items or prices that are part of the sales transaction. For example, when a particular item is scanned by the scanner at a point-of-sale register, the display screen may show a textual description of the item and a sale price for that particular item.

In some circumstances, the receipt printer at a point-of-sale register may be supplied with a roll of paper that includes pre-printed color coupons on a reverse side of the paper. Such a point-of-sale register can thereby provide each consumer with a black-and-white receipt on a front side of the paper and one or more color coupons on the rear side of the paper.

Some retail stores may also install coupon printers along one or more store aisles adjacent to selected products. For example, a coupon printer can be installed in a store aisle next to a selected food item. When a consumer presses a button on the coupon printer, the printer can output a color coupon that provides a discount for the selected food item. Thereafter, the consumer may submit the coupon to the store worker after arriving at the point-of-sale register to complete the transaction.

SUMMARY

Some embodiments of a point-of-sale register system may include a first color printer for printing color coupons and a second printer for printing transaction receipts. Each of the first and second printers may include a generally small footprint so as to reduce the space occupied by the printers at the point-of-sale register. Further, the first and second printers may be supported by a printer stand that arranges them in a vertical array so as to efficiently use the space at the point-of-sale register. In some embodiments, the vertical array of printers is positioned near the user's hands and within the user's immediate line of sight when viewing the register's display screen, thereby reducing the likelihood that printed coupons go unnoticed by the user of the point-of-sale register. The printer stand may include sidewalls that are configured to provide convenient hand-swipe access to the lower printer (e.g., providing clearance for lateral hand movements of a user toward a paper output of the lower printer), and a number of structures integrated with the printer stand can enhance user safety by hindering the printer stand from tipping and by concealing printer cords that may otherwise interfere with the user's hand motions.

In particular embodiments, a point-of-sale register apparatus may include a user input device to input information indicative of one or more products in a transaction. The input device may be selected from a group consisting of a keyboard, a mouse, a credit card reader, an optical scanner, and a touch screen. The apparatus may also include a display device to display transaction information from the transaction. The apparatus may further include a coupon printer and a receipt printer each having a footprint width of less than about eight inches. At least one of the coupon printer and the receipt printer may output a transaction document indicative of the transaction. The apparatus may also include a printer stand to support one of the coupon printer and the receipt printer in generally vertical alignment above the other. The printer stand may include two opposing side panels coupled to an elevated support surface that define a lower cavity to receive one of the coupon printer and the receipt printer. The printer stand may further include a plurality of retaining wall portions extending general vertically from the elevated support surface so that the other of the coupon printer and the receipt printer is supported on the elevated support surface between the retaining wall portions. The side panels of the printer stand may have non-linear front edges that recess rearwardly to at least partially define a lateral hand access path for lateral hand movements of a user toward a paper output of the one of the coupon printer and the receipt printer in the lower cavity.

In some embodiments an in-store receipt printing apparatus for a point-of-sale register apparatus may include an upper printer arranged above a lower printer. One of the upper and lower printers may output coupons during a transaction in which the other of the upper and lower printers outputs a transaction receipt. The apparatus may also include a printer support structure to retain the upper and lower printers in a vertical array. The printer support structure may include an upper tray extending between opposing side walls to define a lower space in which the lower printer is received. The printer support structure may also include at least one lower anchor member extending from one or both of the opposing side walls so that the lower printer rests on the lower anchor member and secures the printer support structure in an operative position. The printer support structure may further include retaining means for retaining the upper printer on the upper tray in generally vertical alignment with the lower printer. The retaining means may define cutaway portions on opposing sides of the upper tray so as to receive one or both of a power cord and a data cable of the upper printer.

In particular embodiments, a point-of-sale printing apparatus may include a first printer arranged in vertical alignment with a second printer. One of the first and second printers may output at least one coupon during a transaction in which the other of the first and second printers outputs a transaction receipt. The apparatus may also include a printer rack device for supporting the first and second printers in generally vertical alignment with one another. The printer rack device may include opposing side panels extending generally vertically from lower edges, and an upper support surface extending between the opposing side panels to support the first printer in vertical alignment above the second printer. The second printer may be positioned in a lower cavity that is at least partially defined under the upper support surface and between the opposing side panels. The lower edges of opposing side panels may extend non-parallel to the upper tray such that the lower edges of the opposing side panels extend non-horizontally when the upper tray is arranged in a horizontal configuration to support the upper printer.

These and other embodiments described herein may provide one or more of the following benefits. First, some embodiments of a point-of-sale register apparatus may include a printer stand that arranges first and second printers in a vertical array so as to efficiently use the space at the point-of-sale register. Second, the vertical arrangement of the first and second printers can be positioned at the point-of-sale register apparatus near the user's hands and within the user's immediate line of sight when viewing the register's display screen, thereby reducing the likelihood that printed receipts and/or coupons go unnoticed by the user. Third, the printer stand can arrange the upper printer at a height sufficient so that a paper access door of the lower printer can be fully or partially opened to allow a paper roll of the lower printer to be accessed and changed. Fourth, the printer stand can have a sufficient weight and other structural features so as to reduce the likelihood that the printer stand will tip in response to incidental impacts. For example, the printer stand can include an anchor portion that is disposed below the lower printer to anchor the printer stand against tipping over. Fifth, the printer stand can provide side access to a receipt, coupon, or other printed item from the lower of the two printers when the printers are aligned in a vertical array. Sixth, the upper printer can be secured in position by a combination of front, back, and rear walls of the printer stand to thereby reduce the likelihood of the upper printer sliding off of the printer stand or tipping over. Seventh, the printer stand can be configured to securely engage a pre-existing integration tray of a point-of-sale register apparatus. Eighth, power and communication cables of the printers can be positioned on either side of the printer stand so as to generally conceal the cables from the view of a consumer.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3D is a side view of the printer stand of FIG. 3A.

FIG. 3E is a front view of the printer stand of FIG. 3A.

FIG. 3F is a side view of the printer stand of FIG. 3A.

FIG. 3G is a rear view of the printer stand of FIG. 3A.

FIG. 4D is a side view of the printer stand of FIG. 4A.

FIG. 4E is a front view of the printer stand of FIG. 4A.

FIG. 4F is a side view of the printer stand of FIG. 4A.

FIG. 4G is a rear view of the printer stand of FIG. 4A.

FIG. 5C is a side view of the printer stand of FIG. 5A.

FIG. 5D is a front view of the printer stand of FIG. 5A.

FIG. 5E is a side view of the printer stand of FIG. 5A.

FIG. 5F is a rear view of the printer stand of FIG. 5A.

FIG. 6C is a side view of the printer stand of FIG. 6A.

FIG. 6D is a front view of the printer stand of FIG. 6A.

FIG. 6E is a side view of the printer stand of FIG. 6A.

FIG. 6F is a rear view of the printer stand of FIG. 6A.

FIG. 7B is a top view of the adapter bracket of FIG. 7A.

FIG. 7C is a side view of the adapter bracket of FIG. 7A.

FIG. 7D is a side view of the adapter bracket of FIG. 7A.

FIG. 8A is a perspective view of an alternative adapter bracket for use with a printer stand, in accordance with some alternative embodiments.

FIG. 8B is a top view of the adapter bracket of FIG. 8A.

FIG. 8C is a side view of the adapter bracket of FIG. 8A.

FIG. 8D is a side view of the adapter bracket of FIG. 8A.

Like reference symbols in the various drawings indicate like elements.

DETAILED DESCRIPTION OF ILLUSTRATIVE EMBODIMENTS

Figure 1:
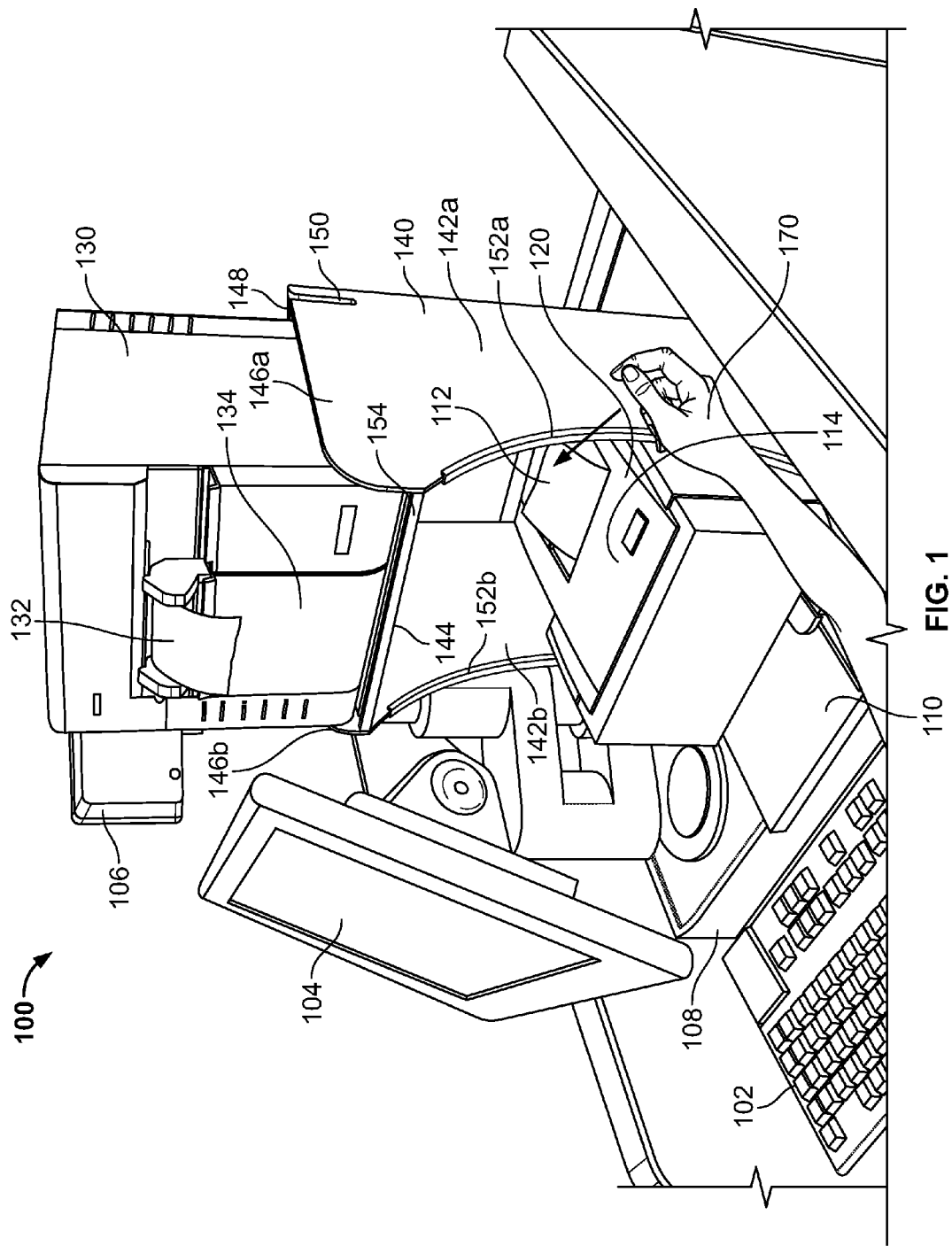
FIG. 1 is a perspective view of a point-of-sale register apparatus, in accordance with some embodiments.
Figure 2:
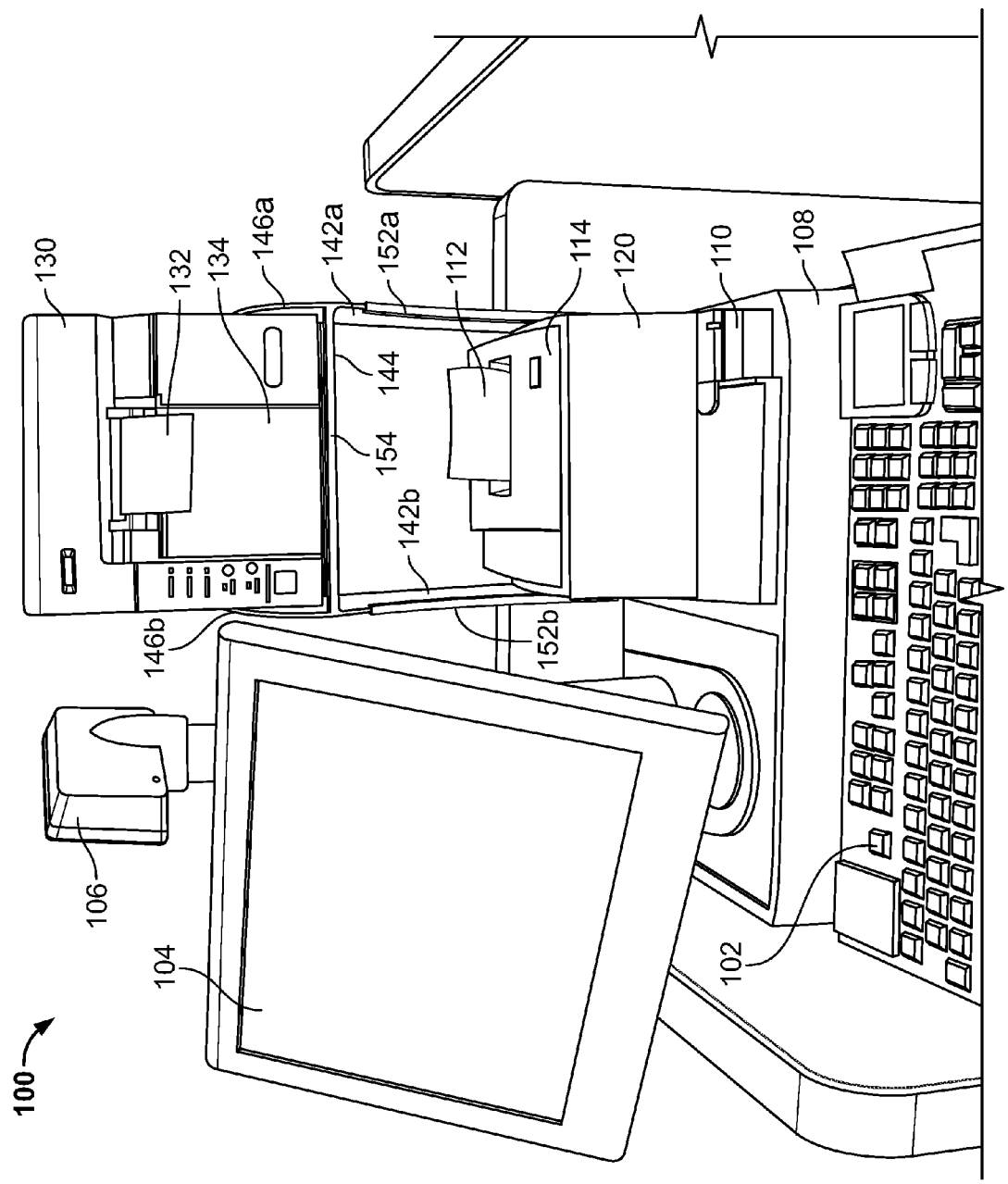
FIG. 2 is a front view of the point-of-sale register apparatus of FIG. 1.

Referring to FIGS. 1-2, some embodiments of a point-of-sale register apparatus 100 can be arranged in a retail store environment for processing sales or other transactions with consumers. The point-of-sale register apparatus 100 can include one or more input devices 102 for inputting information related to products, payment information (e.g. credit card information), and other retail transaction related data. In various embodiments, input devices 102 can take the form of a keyboard, a mouse, a credit card reader, an optical scanner (e.g. for scanning bar codes for various retail items), or a touch screen (e.g. to allow a consumer to provide an electronic signature, or other payment related information). For example, the input device 102 can be a keyboard used to enter prices for retail items or to enter credit card or debit card information.

The point-of-sale register apparatus 100 can include a display device 104 for displaying information related to retail transactions. For example, the display device 104 may be in the form of an LCD monitor that can display prices of retail items scanned by an optical scanner of the point-of-sale register apparatus 100. As another example, the display device 104 can display price totals for items being purchased by a consumer to inform the consumer of a required payment value. In some embodiments, the point-of-sale register apparatus 100 includes a secondary display device 106 for displaying information to a consumer. For example, the secondary display device 106 can indicate the total amount of money owed by a consumer for all items purchased by the consumer. This information may be displayed contemporaneously along with the individual price of the most recently scanned item. As another example, if the consumer pays for a portion of a transaction, the secondary display device 106 can indicate the remaining amount that needs to be paid by the consumer in order to complete the transaction.

As described in more detail below, the point-of-sale register apparatus 100 can include a printer stand 140 that positions first and second printers 120 and 130 in a vertical array. Such an arrangement of the first and second printers 120 and 130 may efficiently use the space at the point-of-sale register apparatus 100 while maintaining the printers 120 and 130 within a user's immediate line of sight when viewing the register's display screen.

Still referring to FIGS. 1-2, one of the printers at the point-of-sale register apparatus 100 may comprise a receipt printer 120 that outputs receipts 112 indicative of sales transactions or other transactions conducted at the point-of-sale register apparatus 100. For example, the receipt printer 120 can be a 4689 SurePOS Receipt Printer supplied by IBM Corporation of Armonk, N.Y. As another example, the receipt printer 120 can be a SureMark 4610 TI4 or TI2 Thermal Receipt Printer supplied by IBM Corporation of Armonk, N.Y. As another example, the receipt printer 120 can be a RealPOS Thermal Receipt Printer model no. 7167 supplied by NCR Corporation of Dayton, Ohio. In some embodiments, the receipt printer 120 prints the receipt 112 as a black-and-white document. In some embodiments, the receipt printer 120 prints the receipt 112 on thermal printer paper. In some embodiments, the receipt printer 120 is a dot matrix printer. In some embodiments, the receipt printer 120 is an ink jet printer.

In some embodiments, the receipt printer 120 includes a power supply. For example, the receipt printer 120 can include a power cable for plugging into a standard 120-volt three prong outlet. As another example, the receipt printer 120 may include one or more internal batteries. In some embodiments, the receipt printer 120 includes one or more cables for connecting to other portions of the point-of-sale register apparatus 100 for receiving printer information. For example, the receipt printer 120 can include a serial printer cable for connecting to a computer processing portion 108 of the point-of-sale register apparatus 100. The computer processing portion 108 may house one or more microprocessors and computer-readable memory devices so as to operate a software program that processes and records retail transactions completed at the point-of-sale register apparatus. As another example, the receipt printer 120 can include a USB cable for receiving printer information indicating what is to be printed on a receipt. Alternatively, the receipt printer 120 may be equipped with a wireless communication device so as to receive printer information via a wireless signal.

In some embodiments, the receipt printer 120 has a relatively small footprint. For example, the depth of the receipt printer 120 can be between about 5 inches and about 12 inches and the width of the of the receipt printer 120 can be between about 6 inches and about 12 inches. As another example, the depth of the receipt printer 120 can be between about 6 inches and about 10.5 inches and the width of the receipt printer 120 can be between about 6 inches and about 10 inches. In some embodiments, the receipt printer 120 has a width of about 8 inches or less. In one example, the receipt printer 120 may have a footprint size of about 10.2 inches in depth and about 7.5 inches in width.

In some embodiments, the receipt printer 120 is positioned on top of an integration tray 110. The integration tray 110 is arranged over the computer processing portion 108 of the point-of-sale register apparatus 100 so as to support the receipt printer 120 in a generally horizontal position. In some embodiments, the integration tray 110 includes grooves or indentations for receiving tabs or support structures extending from a bottom surface of the receipt printer 120. For example, the receipt printer 120 may have a number of cylindrical support legs extending from its bottom surface. The integration tray 110 can include an equal number of cylindrical indentations for receiving the cylindrical support legs. By matching up to the cylindrical support legs, the cylindrical indentations ensure that the receipt printer 120 is properly aligned on the integration tray 110 while also securing the receipt printer 120 in place. As another example, the receipt printer 120 may include a number of tabs extending from its bottom surface and the integration tray 110 can include grooves for receiving the tabs. In some embodiments, the integration tray 110 includes one or more outlets for receiving a power supply cable of the receipt printer 120. For example, the integration tray 110 may include a 120-volt three prong outlet to allow a power cable of the receipt printer 120 to be plugged into the integration tray 110.

Still referring to FIGS. 1-2, another of the printers at the point-of-sale register apparatus 100 may comprise a coupon printer 130 that outputs one or more coupons 132 to be provided to the consumer contemporaneously with the receipt 112 from the receipt printer 120. For example, the coupon printer 130 can be a thermal printer, a dot matrix printer, a laser printer, or an ink jet printer. As another example, the coupon printer 130 can be a TM-T90 thermal coupon printer supplied by Epson America, Inc. of Long Beach, Calif. As yet another example, the coupon printer 130 can be a TM-C600 Model M228A Catalina Connections CMC6 POS Coupon Printer supplied by Epson America, Inc. of Long Beach, Calif. In some embodiments, the coupon printer 130 is a color printer that provides color coupons 132. Alternatively, the coupon printer 130 outputs coupons 132 printed only as black-and-white documents. The coupon printer 130 can print off one or more coupons 132 for items sold in a store that houses the point-of-sale register apparatus 100. As such, the consumer may return to the retail store at a later time so as to use the coupons 132 on additional items in the store. Thus, the coupons 132 can be provided to consumers so that the consumers can receive discounts on items during future visits to the store. The coupons 132 can provide an incentive for the consumers to make return visits to the store.

In some embodiments, the coupons 132 printed by the coupon printer 130 are related to purchases made by a consumer during a current transaction. For example, if a consumer purchases a sports drink, the receipt printer 120 can output a receipt 112 indicative of the purchase transaction for the sports drink and the coupon printer 130 can output one or more coupons 132 for the brand of sports drink purchased by the consumer, or a different brand of sports drink. Continuing with this example, the coupon printer 130 can output coupons 132 for related products, such as energy bars, soft drinks, energy drinks, energy gels, or sporting goods. After the consumer's payment is received, a store worker using the point-of-sale register apparatus 100 can remove the receipt 112 and the coupons 132 and contemporaneously provide them to the consumer. As another example, if a consumer purchases a number of frozen entrees, the coupon printer 130 can print off coupons for the same types of frozen entrees purchased by the consumer, other types of frozen entrees, or other prepackaged meals.

In some embodiments, the coupon printer 130 can receive a continuous paper roll rather than individual paper sheets. The coupons 132 can be printed off onto the roll and the coupons 132 can be torn off from the roll once the printer has completed printing a set of coupons. In some embodiments, coupons 132 can be removed by a store worker and handed to a consumer. In alternative embodiments, coupons 132 can be obtained directly by the consumer from the coupon printer 130.

Still referring to FIGS. 1-2, the coupon printer 130 may have a footprint that is generally similar to the footprint of the receipt printer 120. For example, the depth of the coupon printer 130 can be between about 5 inches and about 12 inches and the width of the of the coupon printer 130 can be between about 6 inches and about 12 inches. As another example, the depth of the coupon printer 130 can be between about 6 inches and about 10 inches and the width of the coupon printer 130 can be between about 6 inches and about 10 inches. In some embodiments, the coupon printer 130 has a depth of about 8 inches or less and a width of about 8 inches or less. In one example, the coupon printer may have a footprint size of about 8 inches in depth and about 7 inches in width.

In some embodiments, the coupon printer 130 includes one or more cables for connecting to a port along or adjacent the point-of-sale register apparatus 100. For example, the receipt printer 120 can include a serial printer cable, an ethernet cable, or a USB cable for receiving printer information via a connection with the computer processing portion 108 of the point-of-sale register apparatus 100. As previously described, the computer processing portion 108 may house one or more microprocessors and computer-readable memory devices so as to operate the software program that processes and records retail transactions completed at the point-of-sale register apparatus 100. The computer processing portion 108 can be configured to receive user input from one or more of the input devices 102, to display transaction information on one or both of the display devices 104 and 106, to cause the receipt printer 120 to output a transaction receipt 112 indicative of a transaction, and to cause the coupon printer 130 to output a number of coupons 132 targeted to the particular consumer participating in the transaction. Also, the coupon printer 130 can include a power cable for connection with a power supply outlet. In some alternative embodiments, the coupon printer 130 may be equipped with a wireless communication device so as to receive printer information via a wireless signal.

Still referring to FIGS. 1-2, some embodiments of the point-of-sale register apparatus 100 apparatus includes a printer stand 140 that positions the receipt printer 120 and the coupon printer 130 in a vertical array. Such an arrangement of the first and second printers 120 and 130 may efficiently use the space at the point-of-sale register apparatus 100 while maintaining the printers 120 and 130 within a user's immediate line of sight when viewing the register's display device 104. In this embodiment, the printer stand 140 includes opposing side panels 142a and 142b. The opposing side panels 142a-b extend in a generally vertical direction above the integration tray 110. The printer stand 140 further includes a support tray 144 supported by and extending between the opposing side panels 142a-b. The support tray 144 supports the upper printer (e.g., the coupon printer 130 in this embodiment) in a position generally above and aligned with the lower printer (e.g., the receipt printer 120 in this embodiment). This vertical configuration positions receipts 112 printed by the receipt printer 120 and coupons 132 printed by the coupon printer 130 in close proximity to each other, thereby allowing a user of the point-of-sale register apparatus 100 to quickly and efficiently grasp both the receipt 112 and coupons 132 once a retail transaction has been completed. This vertical configuration also reduces the aggregated footprint of the receipt printer 120 and coupon printer 130 on the integration tray 110. In particular, both printers 120 and 130 can be positioned in the available space above the integration tray 110 without interfering with the display devices 104 and 106. By reducing the amount of horizontal space occupied by the two printers 120 and 130, the printer stand 140 allows the point-of-sale register apparatus 100 to efficiently use the available space at the register apparatus 100. Also, the total space occupied by each register apparatus 100 can be reduced due to the vertical arrangement of the two printers 120 and 130, thereby allowing more of the retail store space to be allocated to aisles between registers or a larger quantity of register apparatuses 100 to be placed within a specified area.

It should be understood from the description herein that, in some alternative embodiments, the positions of the receipt printer 120 and the coupon printer 130 can be reversed so that the receipt printer 120 is positioned substantially above and in alignment with the coupon printer 130. In such circumstances, the printer stand 140 maintains the printers 120 and 130 in a vertical array. As before, such an arrangement of the first and second printers 120 and 130 may efficiently use the space at the point-of-sale register apparatus 100 while maintaining the printers 120 and 130 within a user's immediate line of sight when viewing the register's display device 104.

In some embodiments, the opposing side panels 142a-b can be positioned so that the distance between them is slightly greater than the width of the receipt printer 120. For example, if the receipt printer 120 is about 7⅞ inches wide, the opposing side panels 142a-b can be positioned about 8 inches apart. As another example, if the receipt printer 120 is about 8¼ inches wide, the opposing side panels 142a-b can be positioned about 8 5/16 inches apart.

In some embodiments, each of the opposing side panels 142a-b can include one or more tabs (e.g., tabs 166a-b as shown in FIGS. 3A-3H) extending from the bottoms of the opposing side panels 142a-b for engaging corresponding grooves in the integration tray 110. For example, the integration tray 110 may be slightly wider than the receipt printer 120. The integration tray 110 can include linear grooves running from front to back across the integration tray 110 on either side of the receipt printer 120. Continuing with this example, each opposing side panel 142a-b includes a tab (e.g. tab 166a as shown in FIGS. 3A-3H) extending from the bottom of each opposing side panel 142a-b for engaging the grooves of the integration tray 110. The mating of the tabs of the opposing side panels 142a-b with the grooves of the integration tray 110 can secure the printer stand 140 in place and align the printer stand 140 to ensure that the coupon printer 130 is positioned substantially above and in alignment with the receipt printer 120. In some embodiments, the opposing side panels 142a-b can engage directly with grooves of the integration tray 110. In some embodiments, the printer stand 140 can be attached to the integration tray 110 using other connecting structures. For example, a number of fasteners can be used to secure the printer stand 140 to the integration tray 110.

As described in more detail below in connection with FIGS. 4A-4G, some embodiments of the top surface of the integration tray 110 can be positioned at a sloping, non-horizontal angle. In such embodiments, the lower edges of the printer stand 140 (e.g., lower edges 268a-b as shown in FIGS. 4A-4H) can be correspondingly angled so as to keep the support tray 144 in a horizontal orientation when the printer stand 140 is positioned on the integration tray 110. For example, if the front surface of the integration tray 110 is sloping downward at an angle of 15-degrees from horizontal, the bottoms of the opposing side panels 142a-b can be angled at 15-degrees from horizontal so that the support tray 144 is generally horizontal when the printer stand 140 is mounted on the integration tray 110. As such, the upper printer 130 may rest on a generally horizontal plane even when the integration tray 110 is in a non-horizontal position. In such embodiments, grooves in the integration tray 110 optionally include front and or rear walls to prevent the printer stand 140 from sliding off of the integration tray 110.

Still referring to FIGS. 1-2, some embodiments of the opposing side panels 142*a*-*b* extend in a vertical direction beyond the support tray 144 to form upper side walls 146*a* and 146*b* respectively. The upper side walls 146*a*-*b* can be positioned so that the distance between them is slightly greater than the width of the coupon printer 130. For example, if the coupon printer 130 is about 7½ inches wide, the side walls 146*a*-*b* can be positioned about 7⁹⁄₁₆ inches apart. The upper side walls 146*a*-*b* can retain the coupon printer 130 in place and prevent the coupon printer 130 from tipping over or from sliding off of the sides of the support tray 144. In some embodiments, the printer stand 140 includes a back panel 148 to further secure the coupon printer 130 in position and prevent the coupon printer 130 from tipping or sliding off the back of the support tray 144.

As shown in FIG. 1, in some embodiments, the side wall 146*a* (or 146*b*) includes a cutaway portion 150 to define a slot or aperture. The cutaway portion 150 is wide enough to allow a power cable, data cable, or both to pass through the side wall 146*a* for connection with the upper printer 130. For example, the coupon printer 130 can include a power cable for plugging into a standard 120-volt three prong outlet and a serial or USB printer cable for receiving printing data. The power cable and printer cable can pass through the cutaway portion 150. In some embodiments, the cutaway portion 150 can be positioned in the back panel 148 rather than the side wall 146*a*. In some embodiments, both the side wall 146*a* and the side wall 146*b* will include cutaway portions to allow a power cable and/or a printer cable of the coupon printer 130 to be positioned on either side of the printer stand 140. This configuration can provide the benefit of allowing cables to be positioned on either side of the printer stand 140 and therefore generally concealed from the view of consumers depending on which side of the printer stand 140 consumers are generally positioned. For example, having cutaway portions on both sides allows cables to be positioned on a side facing the display device 104 regardless of which side of the display device 104 the printer stand 140 is positioned. In such situations, the display device 104 can partially block the view of the cables, and therefore generally conceal the cables.

As another example, referring to FIG. 2, if consumers are generally positioned to the left of the printer stand 140 when checking out, the cables can be positioned so as to run through the cutaway portion 150 of the side wall 146*a*, and therefore generally concealed from the view of consumers. As a further example, if consumers are generally positioned to the right of the printer stand 140 when checking out, the cables can be positioned so as to run through the cutaway portion of the side wall 146*b*, and therefore generally concealed from the view of consumers. In some embodiments, only the side wall 146*b* will have a cutaway portion and the side wall 146*a* will not include a cutaway portion.

In some embodiments, the opposing side panels 142*a*-*b* will include curved front edges 152*a* and 152*b*, respectively. In some embodiments, each of the curved front edges 152*a*-*b* form a generally concave curvature that bulges rearwardly away from the front of the printer stand 140. As such, a portion of each front edge 152*a*-*b* is positioned substantially behind vertical planes of the front faces of the receipt printer 120 and the coupon printer 130. In some embodiments, the curved front edges 152*a*-*b* recede from the front of the printer stand 140 so that a portion of each front edge 152*a*-*b* is positioned behind a portion of the lower printer (e.g., the receipt printer 120 in this embodiment). This allows side access to the receipt 112 output from the receipt printer 120.

For example, as illustrated in FIG. 1, a user can swipe their hand 170 over the top of the receipt printer 120 from the side in order to grasp the receipt 112 and remove the receipt 112 from the receipt printer 120. Since both of the opposing side panels 142*a*-*b* include curved front edges, the printer stand 140 allows side access of the receipt 112 from both the left and right side, thus accommodating both right and left handed users. As described in more detail below, all or a portion of the curved front edges 152*a* and 152*b* may be equipped with edge guards 160*a* and 160*b* so as to protect a hand from contact with the front edges 152*a*-*b*.

In some embodiments, the front edges 152*a*-*b* of the opposing side panels 142*a*-*b* can take shapes other than a curved shape while still allowing side access to the receipt 112. For example, one or both of the opposing side panels 142*a*-*b* can include a square or rectangular shaped cutaway large enough to allow an average person to swipe a hand through the cutaway section and obtain side access to the receipt. However, the curved front edges of the opposing side panels 142*a*-*b* shown in FIG. 1 provide the advantage of having no sharp corners that could injure a store worker or consumer.

Still referring to FIGS. 1-2, the support tray 144 of the printer stand 140 is positioned at a height sufficient to allow a paper access door 114 of the lower printer 120 to be fully opened to allow access to a paper roll therein. In some embodiments, the support tray 144 is positioned at a height sufficient to allow the paper access door 114 of the receipt printer 120 to be partially opened enough to allow access to a paper roll of the receipt printer 120. In some embodiments, the paper access door 114 is a hinged door that opens in a vertical direction to allow a paper roll contained within the receipt printer 120 to be accessed and replaced. In some embodiments, the support tray 144 is positioned at a height that is sufficient to not only account for the height of the paper access door 114, but also to allow for extra space to accommodate a hand of an average or above average sized person. This can allow a store worker or other person to open the paper access door 114 and keep a hand on the paper access door 114 without scraping the hand against the support tray 144. For example, a store worker may rest her hand on the top of the open paper access door 114 while replacing a paper roll in order to hold the paper access door 114 open. The support tray 144 is positioned so as to allow extra space above the open paper access door 114 to accommodate the store worker's hand.

In some embodiments, the paper access door 114 may be positioned on another portion of the receipt printer 120. For example, the paper access door 114 may be positioned on the side of the receipt printer 120. In such circumstances, one or both of the opposing side panels 142*a*-*b* may include a paper access window to allow side access to the paper access door 114 through one or both of the opposing side panels 142*a*-*b*. The paper access window can be of sufficient size so as to allow an average person to readily reach through the paper access window and open the paper access door 114. In some embodiments, the printer stand 140 is constructed of a material that is sufficiently heavy so as to prevent accidental tipping of the printer stand 140. For example, the printer stand 140 can be manufactured from 14 gauge steel.

In some embodiments, the support tray 144 is positioned at a height so as to hold the coupon printer 130 in a position where the top of the coupon printer 130 is about equal to the height of an average consumer. For example, the top of the coupon printer 130 can be between about 4½ feet to about 6½ feet from the floor. As another example, the top of the coupon printer 130 can be between about 5 feet to about 6 feet from the floor. By being positioned at the height of an average consumer, the coupon printer 130 can issue coupons 132 at about eye level, thereby making the coupons more noticeable to consumers and making it more likely that consumers will take the coupons and return to the store to use the coupons.

In some embodiments, the printer stand 140 can include one or more tabs on the bottom of the opposing side panels 142a-b that extend in an inward horizontal direction underneath the receipt printer 120 and above the integration tray 110. For example, each side panel 142a-b can have a tab that extends inwardly and rest under the receipt printer 120. As another example, the printer stand 140 can include one or more bars extending between the opposing side panels 142a-b below the receipt printer 120. The one or more tabs can anchor the printer stand 140 in place and prevent the printer stand 140 from tipping over. The weight of the receipt printer 120 can help to hold the printer stand 140 in place. For example, a cashier may bump the support tray 144 or another portion of the printer stand 140 when opening the paper access door 114 to access a paper roll. The tabs can prevent the printer stand 140 and the coupon printer 130 from tipping over by anchoring the printer stand 140 under the receipt printer 120. As another example, a store worker or consumer may bump the printer stand 140 when reaching for the receipt 112 and the tabs can prevent the printer stand 140 from tipping. As yet another example, a consumer or store worker may accidentally apply force to the front of the coupon printer 130 while reaching for the coupon 132. The tabs help to prevent the printer stand 140 from tipping and can prevent the coupon printer 130 from falling off of the printer stand 140.

In some embodiments, the support tray 144 of the printer stand 140 includes a front lip 154. The front lip 154 can secure the coupon printer 130 in position on the support tray 144 and prevent the coupon printer 130 from sliding off the front edge of the support tray 144. In some embodiments, the front lip 154 has a height that is sufficient to allow a paper access door 134 of the coupon printer 130 to be fully opened or partially opened enough to allow access to a paper roll of the coupon printer 130. For example, the paper access door 134 is positioned on the front face of the coupon printer 130. The hinge for the paper access door 134 is positioned at the bottom of the coupon printer 130. The paper access door 134 is opened by pulling the top of the paper access door 134 forward. The top of the front lip 154 is low enough to allow the paper access door 134 to be fully opened.

Referring now to FIGS. 3A-3H, some embodiments of the printer stand 140 include a support tray 144 for receiving and supporting an upper printer (e.g. the coupon printer 130). The support tray 144 positions the coupon printer 130 generally above and vertically aligned with a lower printer (e.g. the receipt printer 120). It should be understood from the description herein, that in some embodiments, the support tray 144 can support the receipt printer 120 and the coupon printer 130 can be positioned generally below and vertically aligned with the receipt printer 120. The support tray 144 is supported by and extends between the side panels 142a and 142b. The side panels 142a-b extend in a vertical direction above the support tray 144 to form upper side walls 146a-b respectively.

In some embodiments, the printer stand 140 includes the rear panel 148 which is positioned above a rear edge of the support tray 144 and the front lip 154 which is positioned above a front edge of the support tray 144. The rear panel 148, front lip 154, and upper side walls 146a-b define a space for receiving the coupon printer 130. The rear panel 148, front lip 154, and upper side walls 146a-b can hold the coupon printer 130 in place and prevent the coupon printer 130 from tipping over or sliding off of the support tray 144. In some embodiments, the front lip 154 has a height that is sufficient to allow a paper access door 134 of the coupon printer 130 to be fully opened or partially opened enough to allow access to a paper roll of the coupon printer 130. For example, the front lip 154 can have a height of about ¼-inch so as to allow the paper access door 134 to be fully opened. As another example, the front lip 154 can have a height between about ⅛-inch and about ½-inch.

In some embodiments, each upper side wall 146a-b includes a cutaway portion 150 that defines a slot or aperture. The cutaway portion 150 is wide enough to allow a power cable, data cable, or both to pass through the side wall 146a or 146b for connection with the upper printer 130. For example, the coupon printer 130 can include a power cable for plugging into a standard 120-volt three prong outlet and a data cable (e.g., an ethernet cable, a serial printer cable, a USB cable, or the like) for receiving printing information. The power cable and printer cable can pass through the cutaway portion 150. In some embodiments, the back panel 148 can include one or more cutaway portions 150. Having cutaway portions 150 in both upper side walls 146a-b provides the benefit of allowing cables to be positioned on either side of the printer stand 140. This allows cables to be positioned on a side of the printer stand 140 that is opposite of a side of the printer stand 140 on which consumers are generally positioned. The cables can then be generally concealed from the view of consumers by being positioned on the opposite side of the printer stand 140 than the consumers.

Still referring to FIGS. 3A-3H, in accordance with some embodiments, the printer stand 140 may include a cable concealing shaft 156. Power or data cables of the upper printer can be concealed by the shaft 156 so as to generally hide the cables from the view of consumers. For example, a power cable, data cable, or both of the coupon printer 130 can be positioned to pass through the cutaway portion 150 of the upper side wall 146b and through the cable concealing shaft 156 so as to generally conceal the cables from view. Further, arranging the cables in the shaft 156 can reduce the likelihood of unplugging the cables in response to inadvertent contact with the cables. In some embodiments, an interior space of the cable concealing shaft 156 is sufficiently large to accommodate multiple power and/or data cables.

In some embodiments, the cable concealing shaft 156 is detachably coupled to the printer stand 140. For example, the cable concealing shaft 156 can be coupled to the printer stand 140 using double sided tape. As another example, one or more quick-connect fasteners can be used to attach the cable concealing shaft 156 to the side panel 142b. In some embodiments, the cable concealing shaft 156 can be repositioned in different places with respect to the printer stand 140. For example, the cable concealing shaft 156 can be detached from the side panel 142b and attached to the side panel 142b in order to conceal cables that are passed through the cutaway portion 150 of the upper side wall 146a. This allows a single cable concealing shaft 156 to be used to conceal cables on either side of the printer stand 140.

In some embodiments, the lower printer (e.g. the receipt printer 120 in this embodiment) may include a side door for accessing a paper roll or paper supply of the receipt printer 120. In such embodiments, the printer stand 140 can optionally include a paper access window 158 for accessing the side paper access door of the receipt printer 120. The paper access window 158 can form an aperture through one of the side panels 142a-b to allow a store worker to access the side paper access door. In some embodiments, the paper access window 158 is large enough to allow a store worker to pass one or more hands through the paper access window 158. The store worker can then open the side paper access door and replace a paper roll or paper supply of the receipt printer 120.

Still referring to FIGS. 3A-3H, in some embodiments, the opposing side panels 142a-b of the printer stand 140 include recessed front edges 152a and 152b, respectively. In some embodiments, each of the recessed front edges 152a-b forms a generally concave curvature that bows rearwardly away from the front of the printer stand 140. As such, a substantial portion or all of each front edge 152a-b is positioned substantially behind vertical planes of the front faces of the receipt printer 120 and the coupon printer 130. This allows side "hand swipe" access to the receipt 112 output from the receipt printer 120. Since both of the opposing side panels 142a-b include curved front edges, the printer stand 140 allows side access of the receipt 112 from both the left and right side, thus accommodating both right and left handed users. In some embodiments, all or a portion of the curved front edges 152a-b are covered by edge guards 160a and 160b respectively. Each of the edge guards 160a-b can define a channel for receiving the curved front edges 152a-b. In some embodiments, the edge guards 160a-b can be curved members formed from rubber or plastic configured to fit over the curved front edges 152a-b in order to prevent store workers or consumers from injuring themselves. For example, the edge guards 160a-b can reduce the likelihood that a store worker will scrape or cut a hand on the curved front edges 152a-b when accessing a receipt output by the receipt printer 120 using a side hand swipe motion (refer, for example, to FIG. 1).

In some embodiments, the printer stand 140 includes one or more front support bars 162. For example, the front support bar 162 can extend between the side panels 142a-b. In use, the front support bar 162 fits underneath the lower printer (e.g., the receipt printer 120 in this embodiment) when the lower printer is installed in an operative position below the support tray 144. The front support bar 162 can help reduce the likelihood that the printer stand 140 will tip over in response to inadvertent impacts from a store worker or consumer. For example, the front support bar 162 may serve as an anchor for the printer stand 140 that is retained in position by the weight of the receipt printer 120. In such circumstances, a store worker may bump the printer stand 140 while attempting to access a receipt of the receipt printer 120, but the front support bar 162 can prevent the printer stand 140 from tipping backwards by anchoring the printer stand 140 between the receipt printer 120 and the integration tray 110. The weight of the receipt printer 120 helps to secure the printer stand 140 in place and prevent tipping of the printer stand 140.

In some embodiments, the printer stand 140 optionally includes one or more rear tabs 164 for securing the printer stand 140 in place relative to the lower printer (e.g. the receipt printer 120 in this embodiment). For example, the printer stand 140 can include one or more rear tabs 164 extending inwardly from the side panels 142a-b near the bottom of the printer stand 140. The rear tabs 164 can prevent the receipt printer 120 from sliding backwards in relation to the printer stand 140. In some instances, the rear tabs 164 can prevent the printer stand 140 from sliding forward with relation to the receipt printer 120 by contacting the rear of the receipt printer 120 and holding the printer stand 140 in place.

Still referring to FIGS. 3A-3H, in some embodiments, the printer stand 140 includes one or more bottom support tabs 166a-b (FIG. 3E) extending from the lower edges 168a-b of the side panels 142a-b, respectively. The bottom support tabs 166a-b can be configured to mate with corresponding grooves 116a-b (FIG. 3A) formed in the top surface of the integration tray 110. The bottom support tabs 166a-b can help to hold the printer stand 140 in place with respect to the integration tray 110. In some embodiments, the bottom support tabs 166a-b extend in a downward direction beyond the lower edges 168a-b a distance that is approximately equal to a depth of the grooves 116a-b. In such embodiments, the bottom support tabs 166a-b can contact the bottoms of the grooves 116a-b while the lower edges 168a-b of the side panels 142a-b contact the upper surface of the integration tray. This configuration can provide extra support for the printer stand 140 while securing the printer stand 140 in place with respect to the integration tray 110. In some embodiments, the width of the bottom support tabs 166a-b can be approximately equal to the width of the grooves 116a-b to allow the sides of the bottom support tabs 166a-b to contact side walls of the grooves 116a-b in order to more securely hold the printer stand 140 in position. In some embodiments, the bottom support tabs 166a-b can be approximately the same length as the grooves 116a-b so that front and rear edges of the bottom support tabs 166a-b contact front and rear sides of the grooves 116a-b. This can prevent the printer stand 140 from sliding forwards or backwards with respect to the integration tray 110.

Figure 3A:
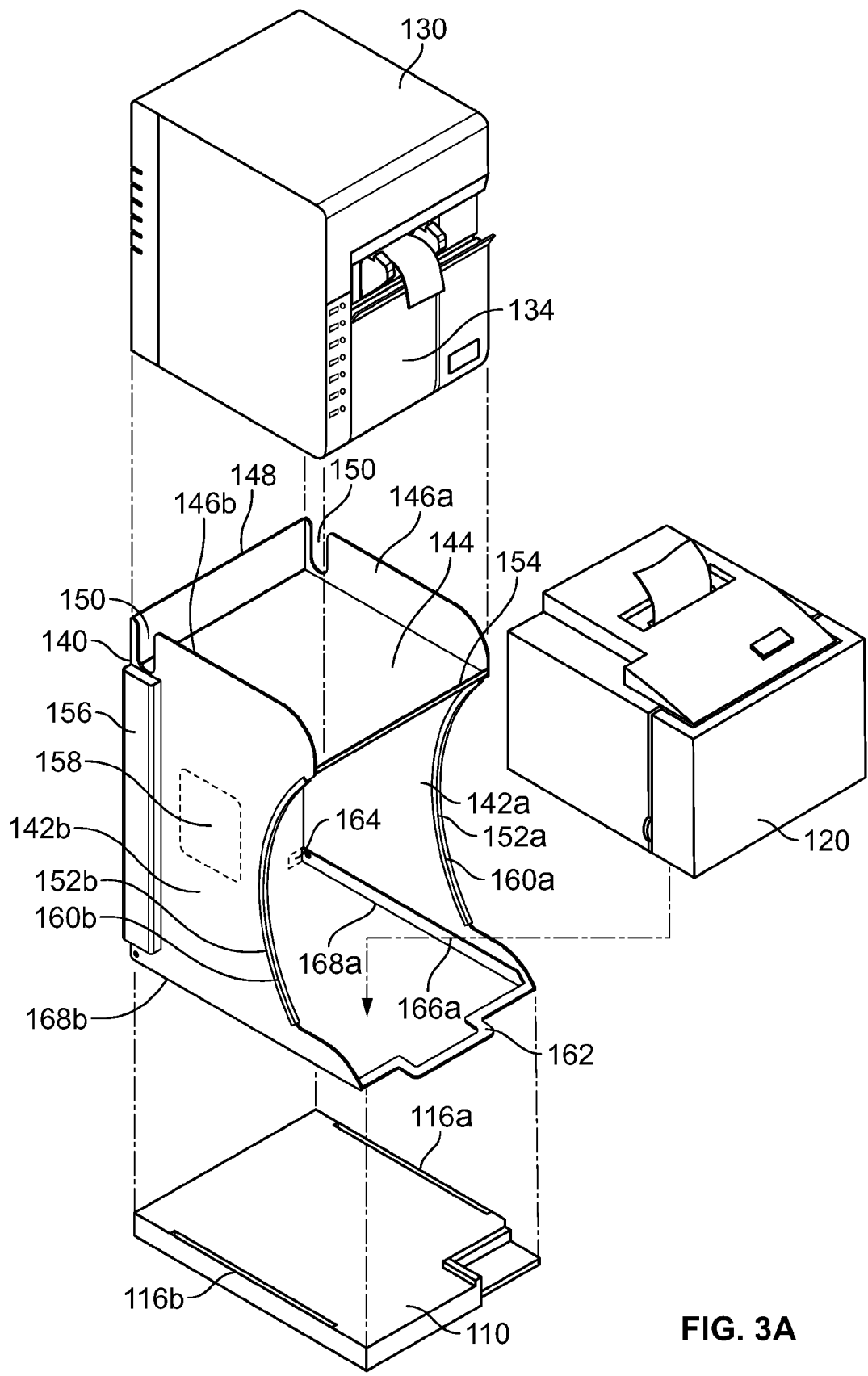
FIG. 3A is a perspective view of a printer stand in relation to first and second printers for a point-of-sale register apparatus, in accordance with some embodiments.
Figure 3B:
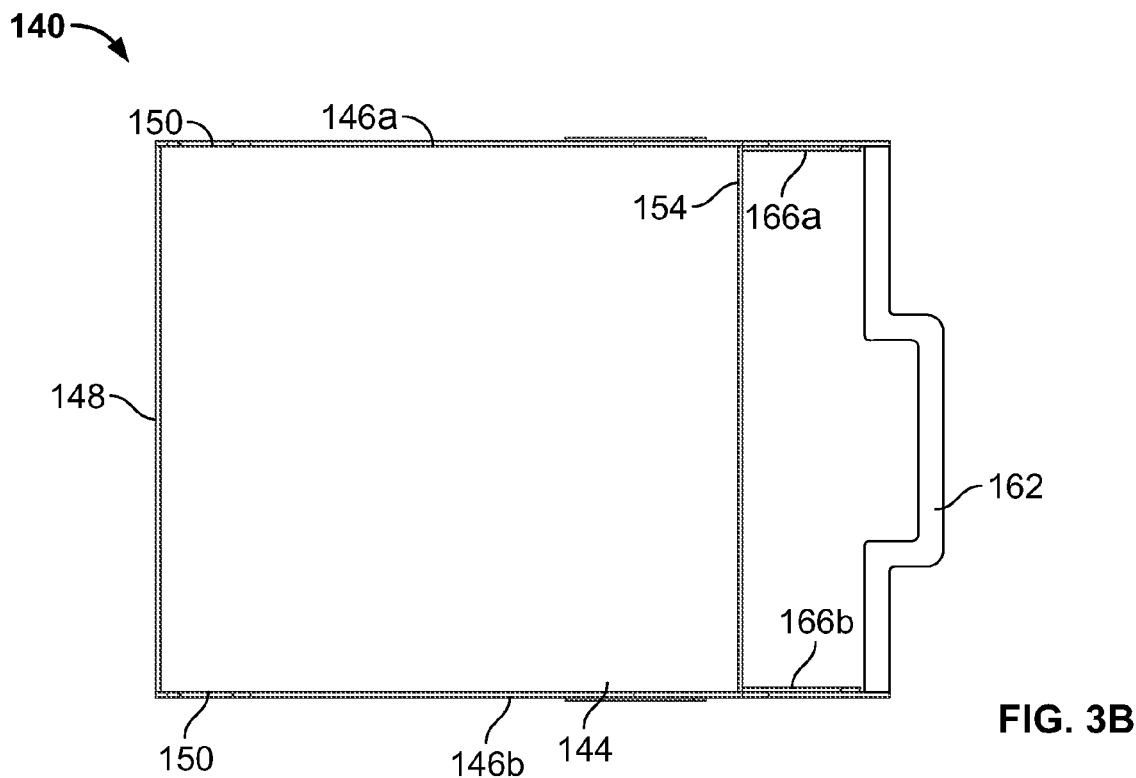
FIG. 3B is a top view of the printer stand of FIG. 3A.
Figure 3C:
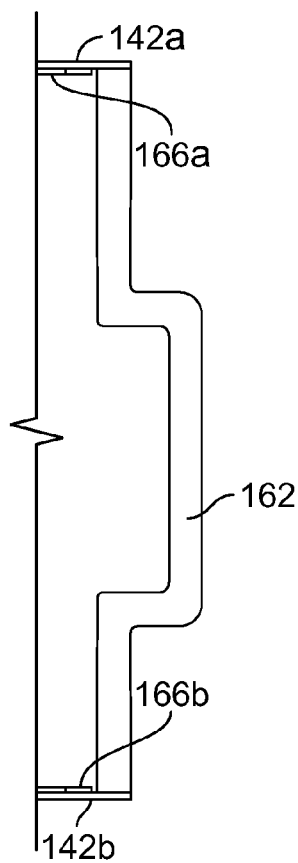
FIG. 3C is a top view of a front support bar of the printer stand of FIG. 3A.
Figure 3H:
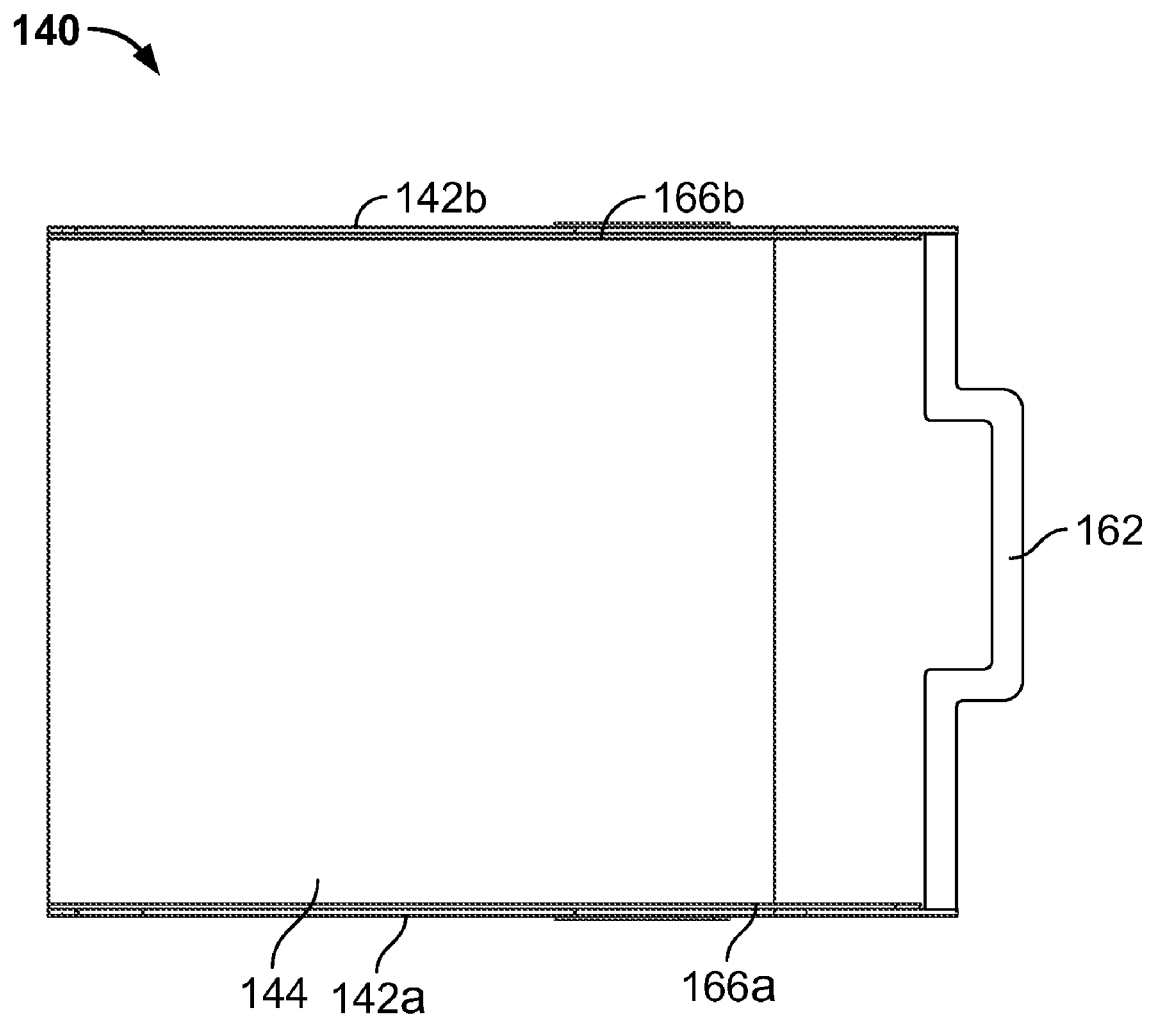
FIG. 3H is a bottom view of the printer stand of FIG. 3A.
Figure 4A:
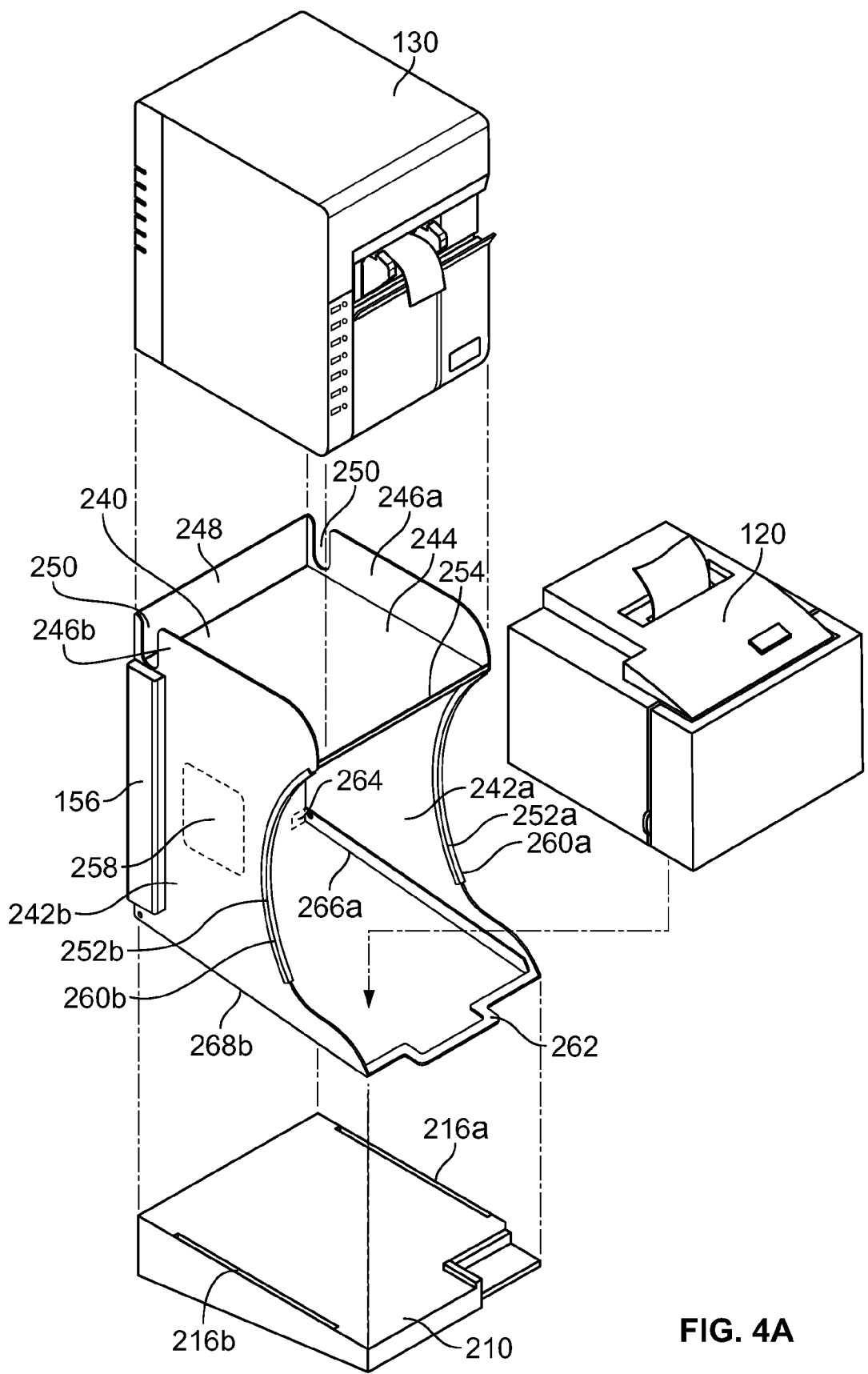
FIG. 4A is a perspective view of an alternative printer stand in relation to first and second printers for a point-of-sale register apparatus, in accordance with some alternative embodiments.
Figure 4B:
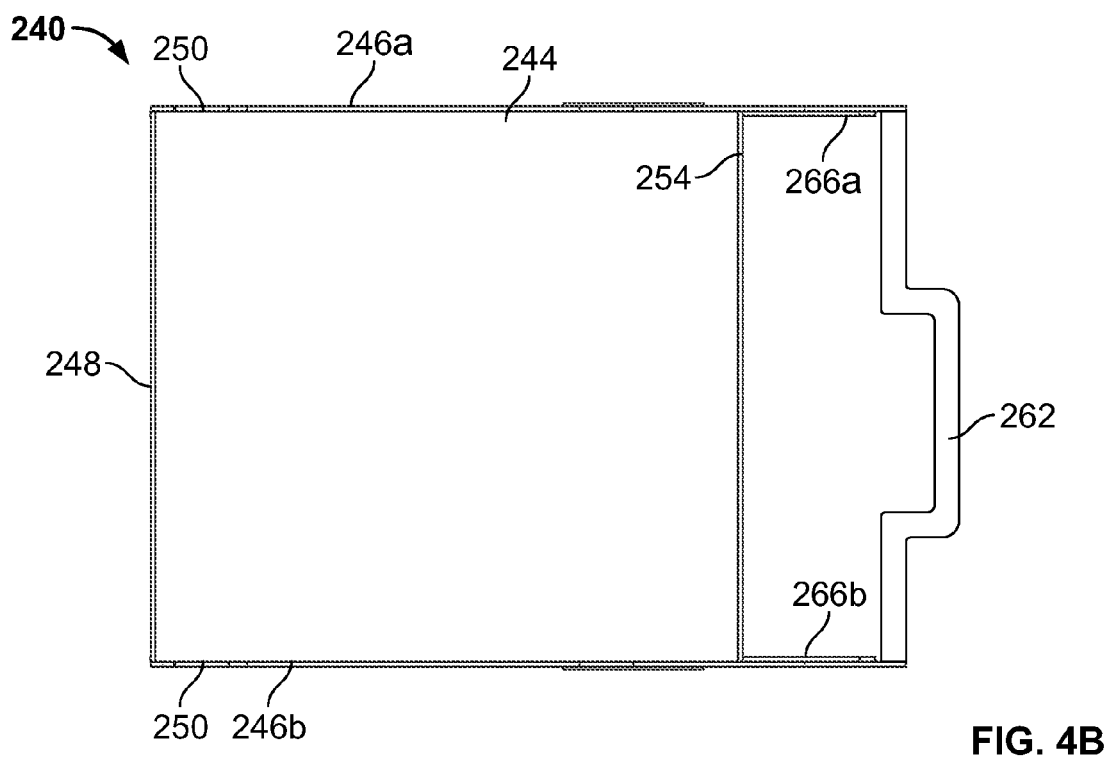
FIG. 4B is a top view of the printer stand of FIG. 4A.
Figure 4C:
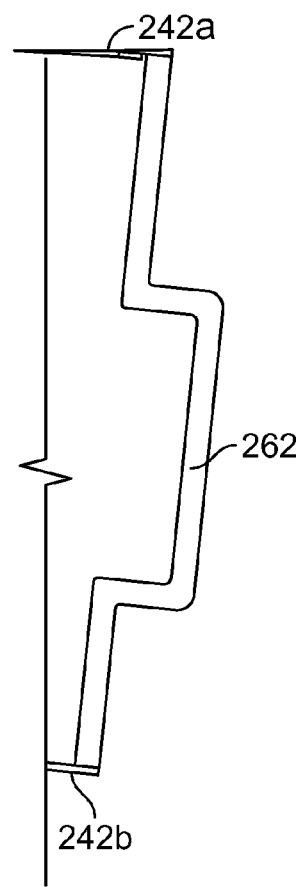
FIG. 4C is a top view of a front support bar of the printer stand of FIG. 4A.
Figure 4H:
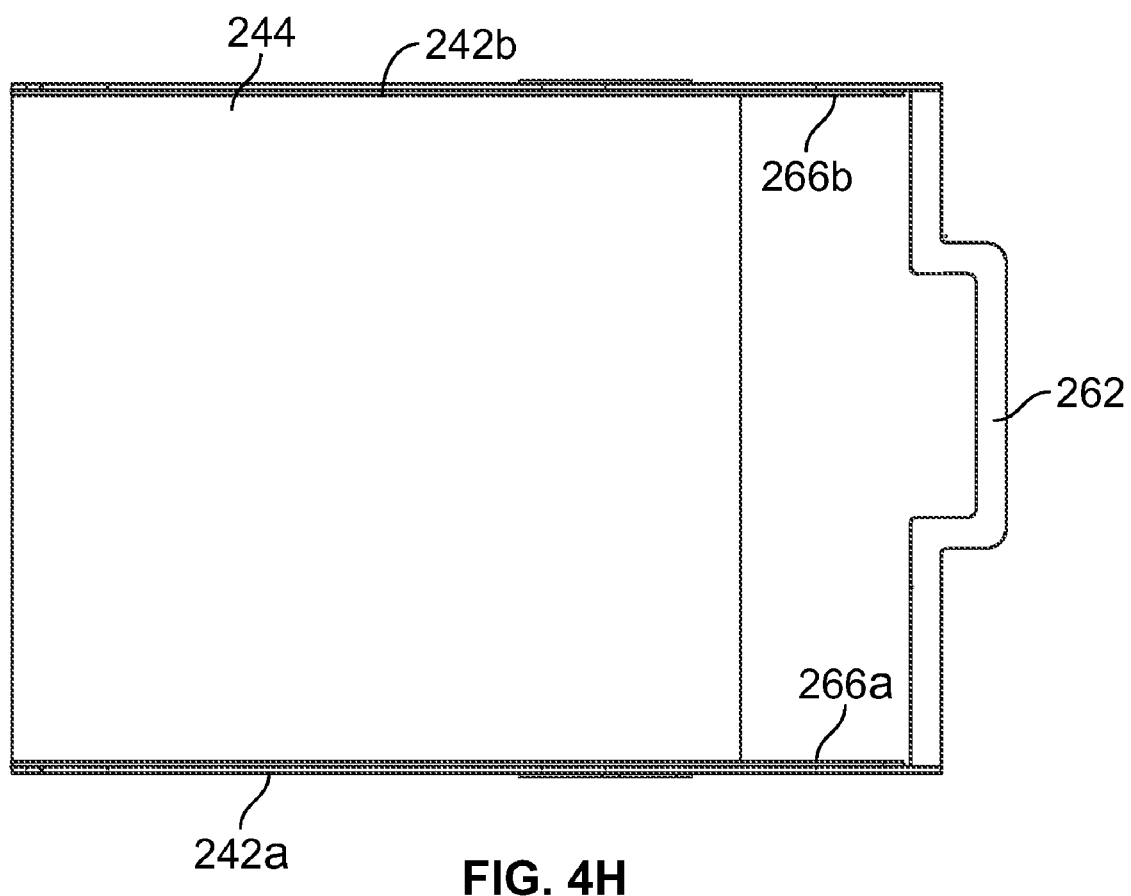
FIG. 4H is a bottom view of the printer stand of FIG. 4A.
Figure 5A:
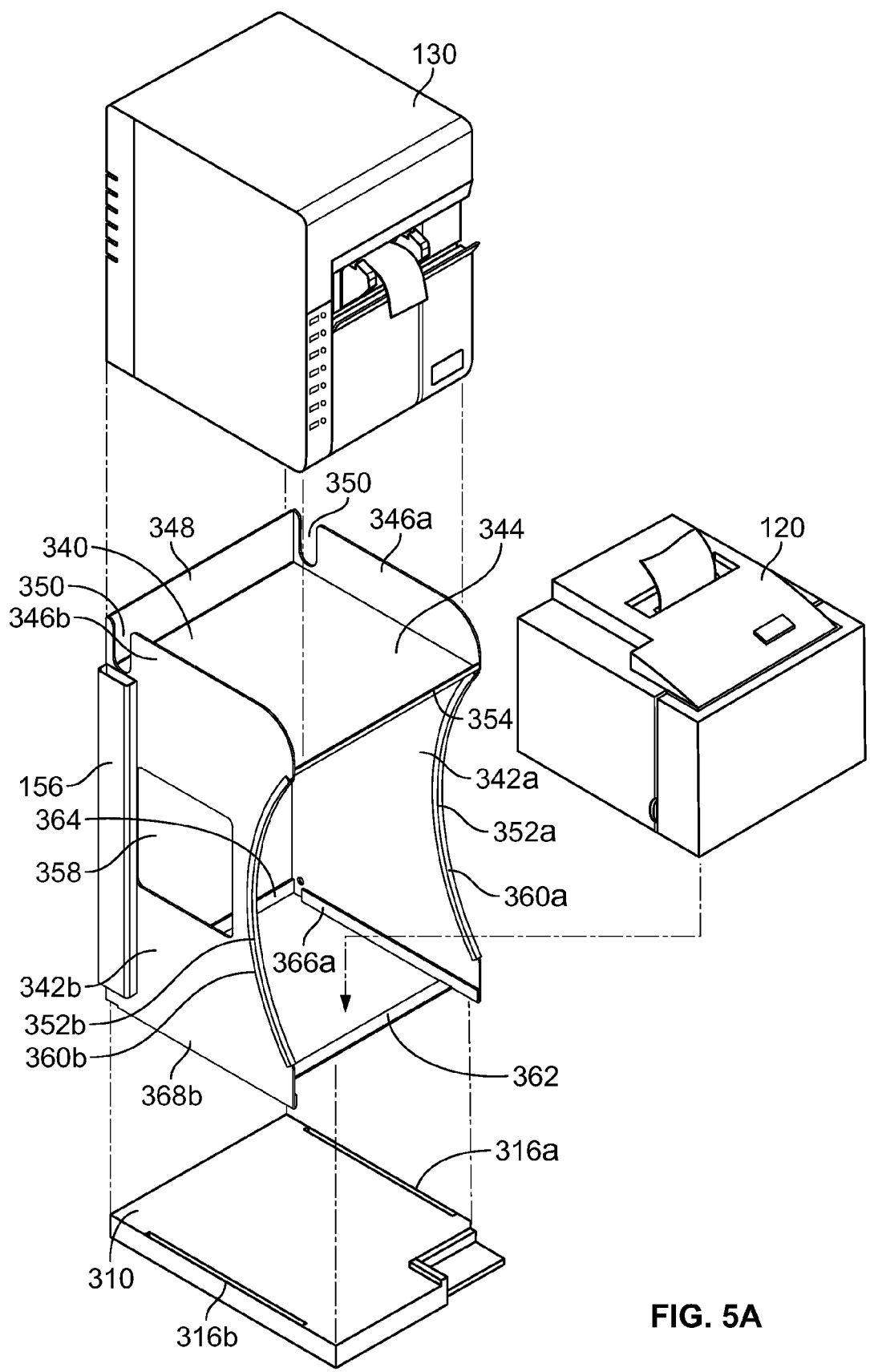
FIG. 5A is a perspective view of an alternative printer stand in relation to first and second printers for a point-of-sale register apparatus, in accordance with some alternative embodiments.
Figure 5B:
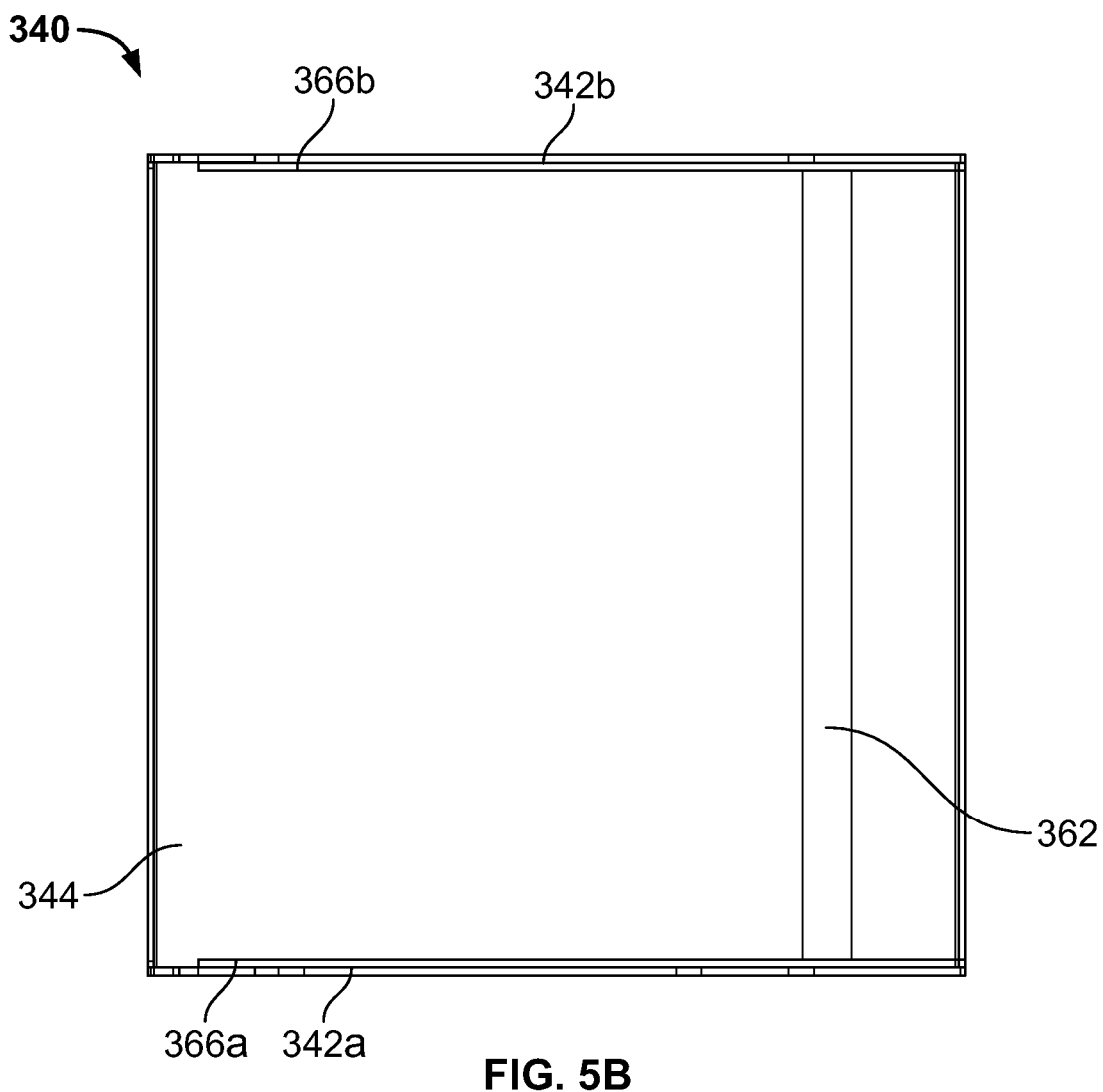
FIG. 5B is a bottom view of the printer stand of FIG. 5A.
Figure 5G:
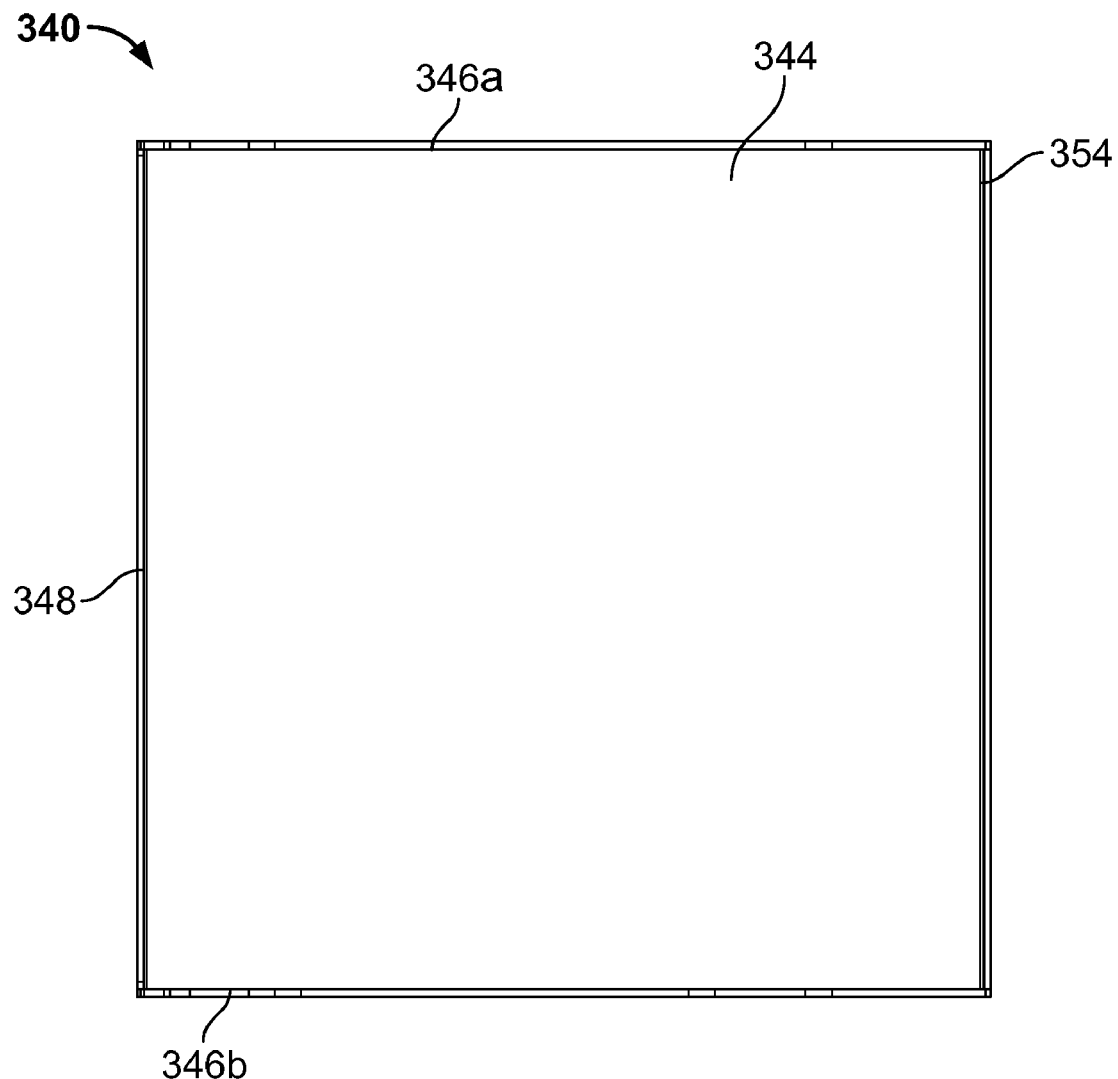
FIG. 5G is a top view of the printer stand of FIG. 5A.
Figure 6A:
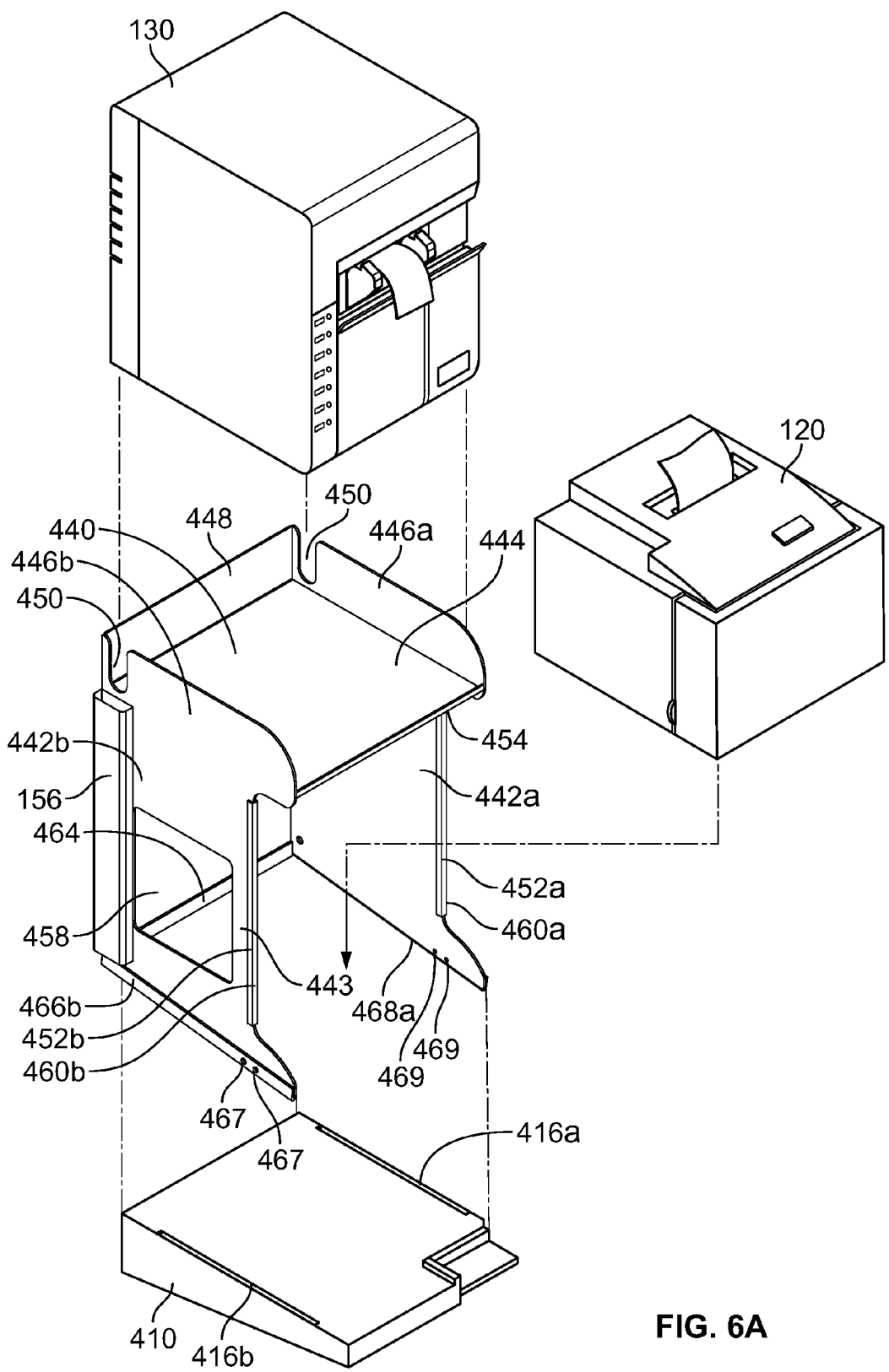
FIG. 6A is a perspective view of an alternative printer stand in relation to first and second printers for a point-of-sale register apparatus, in accordance with some alternative embodiments.
Figure 6B:
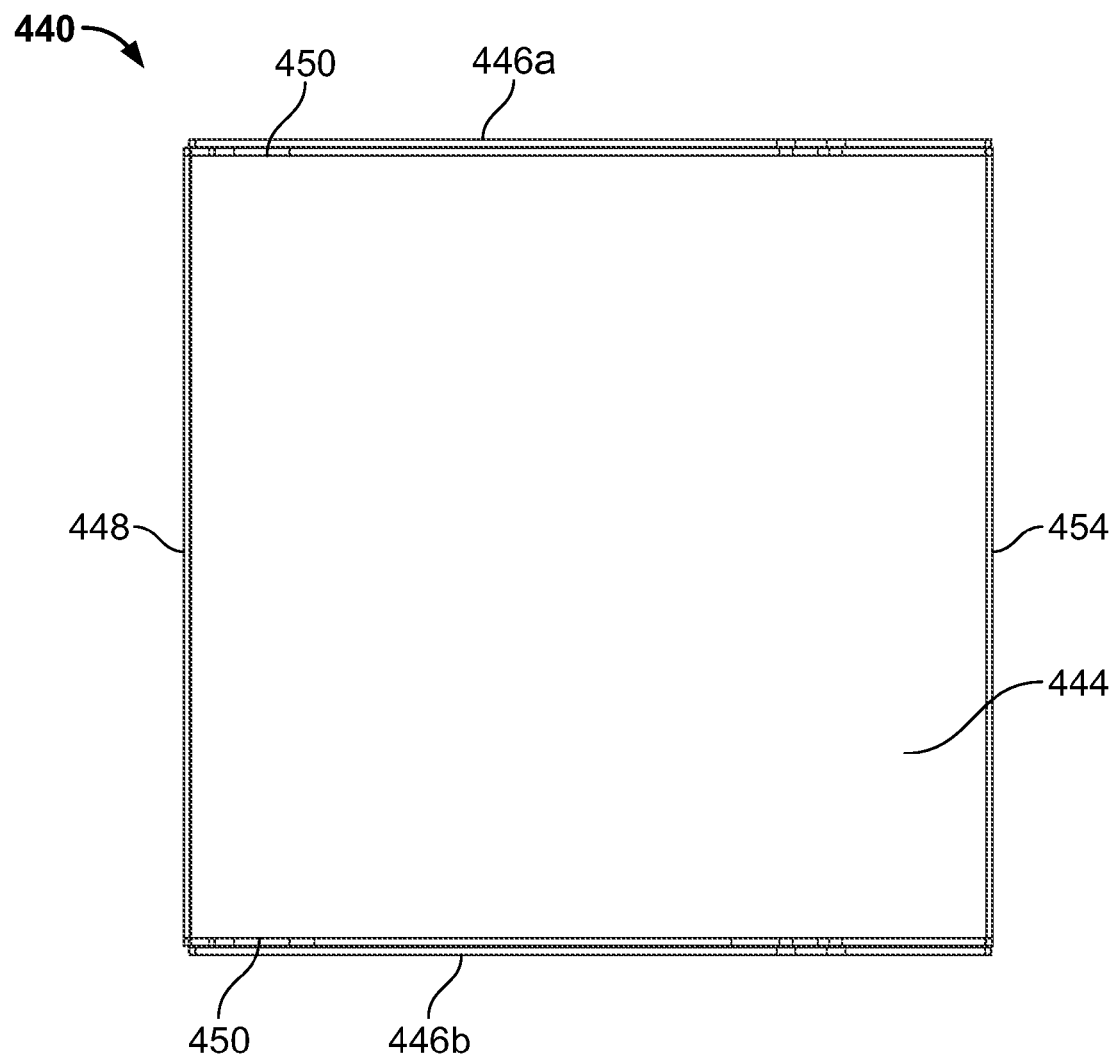
FIG. 6B is a top view of the printer stand of FIG. 6A.

In the example depicted in FIG. 3A, the lower edges 168a-b are generally parallel to the support tray 144. Thus, if the integration tray 110 is positioned in a relatively horizontal plane, the support tray 144 will be relatively horizontal when the bottom support tabs 166a-b are engaged with the grooves 116a-b of the integration tray 110. In some embodiments, each side panel 142a-b can include multiple tabs or pegs extending downwardly for engaging multiple grooves or holes of the integration tray 110. In some embodiments, the printer stand 140 does not include bottom support tabs. In such embodiments, the lower edges 168a-b can engage the grooves 116a-b directly.

Referring now to FIGS. 4A-4H, some alternate embodiments of a printer stand 240 may include the lower edges 268a-b that are generally non-parallel to the support tray 244. In such circumstances, the support tray 244 of the printer stand 240 can provide a generally horizontal surface for supporting an upper printer (e.g., the coupon printer 130 in this embodiment) even if the top surface of the integration tray 210 is positioned in a downwardly sloped plane. Accordingly, the lower printer (e.g., the receipt printer 120 in this embodiment) may rest on a downwardly sloped plane while the upper printer (e.g., the coupon printer 130 in this embodiment) rests in a generally horizontal plane defined by the support tray 244.

Similar to previously described embodiments, the printer stand 240 depicted in FIGS. 4A-4H includes opposing side panels 242a-b. The opposing side panels 242a-b are spaced apart so as to provide space for the lower printer (e.g. the receipt printer 120 in this embodiment) to be positioned between the opposing side panels 242a-b. The printer stand 240 includes the support tray 244 supported by and extending between the opposing side panels 242a-b for receiving the upper printer (e.g. the coupon printer 130 in this embodiment). The opposing side panels 242a-b can extend in a vertical direction above the support tray 244 to form upper side walls 246a-b. The upper side walls 246a-b can hold the coupon printer 130 in position and prevent the coupon printer 130 from tipping or sliding off of the support tray 244. The printer stand 240 can additionally include a rear panel 248 and a front lip 254 for holding the coupon printer 130 in place. In some embodiments, the front lip 254 has a height sufficient to allow a paper access door of the coupon printer 130 to be fully or partially opened to allow access to a paper roll or paper supply of the coupon printer 130 as described for the previous embodiment of the printer stand 140.

Similar to previously described embodiments, the upper side walls 246a-b can include cutaway portions 250 to allow power and/or data cables of the coupon printer 130 to pass through the upper side walls 246a-b. In some embodiments, the cable concealing shaft 156 described above with reference to FIGS. 3A-3H can be attached to one of the opposing side panels 242a-b in order to generally conceal cables that are passed through one of the cutaway portions 250. Optionally, one or both of the side panels 242a-b may include a paper access window 258 that can allow a store worker to access and open a side paper access door of the receipt printer 120. The paper access window 258 can be sufficiently sized to allow a store worker to pass one or more hands through the paper access window and open the side paper access door of the receipt printer 120. In some embodiments, the receipt printer 120 can include a front paper access door that opens in an upward direction and allows access to a paper roll or paper supply of the receipt printer 120. In such embodiments, the support tray 244 can be positioned at a sufficient height to allow the front paper access door to be opened wide enough to allow access to a paper roll or paper supply of the receipt printer 120. Similar to previously described embodiments, the printer stand 240 may include rear tabs 264 extending inwardly from the opposing side panels 242a-b for holding the printer stand 240 in position relative to the receipt printer 120. The rear tabs 264 can prevent the receipt printer 120 from sliding backwards with relation to the printer stand 240.

In some embodiments, the opposing side panels 242a-b include recessed front edges 252a and 252b, respectively. In the depicted embodiment, each of the recessed front edges 252a-b forms a generally concave curvature that bows rearwardly away from the front of the printer stand 240. As such, a portion of each front edge 252a-b is positioned substantially behind vertical planes of the front faces of the receipt printer 120 and the coupon printer 130. In some embodiments, the curved front edges 252a-b recede from the front of the printer stand 140 so that a portion of each front edge 252a-b is positioned behind a portion of the lower printer (e.g., the receipt printer 120 in this embodiment). This allows side "hand swipe" access to a receipt output from the receipt printer 120. Since both of the opposing side panels 242a-b include curved front edges, the printer stand 240 allows side access of the receipt from both the left and right side, thus accommodating both right and left handed users. In some embodiments, the front edges 252a-b are covered by edge guards 260a and 260b, respectively. In some embodiments, the edge guards 260a-b can be curved members formed from rubber or plastic configured to fit over the curved front edges 252a-b in order to prevent store workers or consumers from injuring themselves. For example, the edge guards 260a-b can reduce the likelihood of store workers scraping or cutting themselves on the curved front edges 252a-b when accessing a receipt output by the receipt printer 120.

Similar to previously described embodiments, the printer stand 240 may include one or more front support bars 262 extending between the side panels 242a-b. The front support bar 262 can engage the underside of the lower printer (e.g., the receipt printer 120 in this embodiment) in order to secure the printer stand 240 and reduce the likelihood of tipping the printer stand 240. For example, a store worker may bump the printer stand 240 while attempting to access a receipt output by the receipt printer 120, but the front support bar 262 can prevent the printer stand 240 from tipping backwards by anchoring the printer stand 240 between the receipt printer 120 and the integration tray 210. The weight of the receipt printer 120 helps to secure the printer stand 240 in place and prevent tipping of the printer stand 240.

In some embodiments, the printer stand 240 includes bottom support tabs 266a-b (FIGS. 4D-E) extending from lower edges 268a-b of the opposing side panels 242a-b for engaging grooves 216a-b (FIG. 4A) in the top surface of an integration tray 210. As previously described, the printer stand 240 can be positioned on the integration tray 210 so as to support the coupon printer 130 in a vertical array with the receipt printer 120. The bottom support tabs 266a-b can engage the grooves 216a-b to secure the printer stand 240 in place relative to the integration tray 210 as described above for the printer stand 140. In some embodiments, the top surface of the integration tray 210 is positioned at a sloping, non-horizontal angle. For example, the rear portion of the top surface of the integration tray 210 can be higher than the front portion of the top surface of the integration tray 210 so that the top surface slopes downward from rear to front. In such embodiments, the lower edges 268a-b can provide a complementary angle so that the support tray 244 is positioned in a generally horizontal orientation when the printer stand 240 is positioned on the integration tray 210. For example, if the front surface of the integration tray 210 is sloping downward at an angle of 10-degrees from horizontal, the lower edges 268a-b can be similarly angled at 10-degrees from horizontal so that the support tray 244 is generally horizontal when the printer stand 240 is mounted on the integration tray 210. As such, the upper printer 130 may rest on a generally horizontal plane even when the integration tray 210 is in a non-horizontal position. In such embodiments, the grooves 216a-b in the integration tray 210 optionally include front and or rear walls to prevent the printer stand 240 from sliding off of the integration tray 210.

Referring now to FIGS. 5A-5G, some alternative embodiments of a printer stand 340 are configured to receive and engage with a lower printer having a different size or shape. Similar to previously described embodiments, the printer stand 340 includes opposing side panels 342a-b. The opposing side panels 342a-b are spaced apart so as to provide space for a lower printer (e.g. a receipt printer 120 in this embodiment) to be positioned between the opposing side panels 342a-b. The printer stand 340 includes a support tray 344 supported by and extending between the opposing side panels 342a-b for receiving an upper printer (e.g. a coupon printer 130 in this embodiment). The opposing side panels 342a-b extend in a vertical direction above the support tray 344 to form upper side walls 346a-b. The upper side walls 346a-b are adapted to hold the coupon printer 130 in position when the coupon printer 130 is supported by the support tray 344 and prevent the coupon printer 130 from tipping or sliding off of the support tray 344. The printer stand 340 additionally includes a rear panel 348 and a front lip 354 for holding the coupon printer 130 in place. In some embodiments, the front lip 354 has a height sufficient to allow a paper access door of the coupon printer 130 to be fully or partially opened to allow access to a paper roll or paper supply of the coupon printer 130 as described for the previous embodiment of the printer stand 140.

Similar to previously described embodiments, the upper side walls 346a-b include cutaway portions 350 to allow power and/or data cables of the coupon printer 130 to pass through the upper side walls 346a-b. In some embodiments, the cable concealing shaft 156 described above with reference to FIGS. 3A-3H is optionally attached to one of the opposing side panels 342a-b in order to generally conceal cables that are passed through one of the cutaway portions 350. Optionally, one or both of the side panels 342a-b includes a paper access window 358 that allows access to a side paper access door of the receipt printer 120. This allows a store worker to open the side paper access door and replace a printer roll or printer paper of the receipt printer 120. For example, the paper access window 458 is optionally configured to accommodate a side paper access door of a point-of-sale Receipt Printer supplied by IBM Corporation of Armonk, N.Y. In some embodiments, the paper access window 358 is sufficiently sized to allow a store worker to pass one or more hands through the paper access window and open the side paper access door of the receipt printer 120. In some embodiments, the receipt printer 120 includes a front paper access door that opens in an upward direction and allows access to a paper roll or paper supply of the receipt printer 120. In such embodiments, the support tray 344 is optionally positioned at a sufficient height to allow the front paper access door to be opened wide enough to allow access to a paper roll or paper supply of the receipt printer 120. The printer stand 340 additionally includes a rear bar 364 extending between the opposing side panels 342a-b near the base of the printer stand 340 for holding the printer stand 340 in position relative to the receipt printer 120. The rear bar 364 prevents the receipt printer 120 from sliding backwards with relation to the printer stand 340. In some instances, the rear bar 364 prevents the printer stand 340 from sliding forward with relation to the receipt printer 120 by contacting a rear surface of the receipt printer 120 and holding the printer stand 340 in place.

In some embodiments, the opposing side panels 342a-b include recessed front edges 352a and 352b, respectively. In the depicted embodiment, each of the recessed front edges 352a-b forms a generally concave curvature that bows rearwardly away from the front of the printer stand 340. As such, a portion of each front edge 352a-b is positioned substantially behind vertical planes of the front faces of the receipt printer 120 and the coupon printer 130. In some embodiments, the curved front edges 352a-b recede from the front of the printer stand 140 so that a portion of each front edge 352a-b is positioned behind a portion of the lower printer (e.g., the receipt printer 120 in this embodiment). This allows side "hand swipe" access to a receipt output from the receipt printer 120. Since both of the opposing side panels 342a-b include curved front edges, the printer stand 340 allows side access of the receipt from both the left and right side, thus accommodating both right and left handed users. This also allows for the printer stand 340 to be placed on either the left or right side of a sales register, such as the point-of-sale register apparatus 100 shown in FIG. 1. In some embodiments, the front edges 352a-b are covered by edge guards 360a and 360b, respectively. In some embodiments, the edge guards 360a-b are curved members formed from rubber or plastic configured to fit over the curved front edges 352a-b in order to prevent store workers or consumers from injuring themselves. For example, the edge guards 360a-b reduce the likelihood of store workers scraping or cutting themselves on the curved front edges 352a-b when accessing a receipt output by the receipt printer 120.

In this embodiment depicted in FIGS. 5A-G, the printer stand 340 includes a support bar 362 extending between the side panels 342a-b. In contrast to previously described embodiments, the support bar 362 does not extend forwardly of the opposing side panels 342a-b. In such circumstances, the printer stand 340 may be configured to engage with a type of lower printer 120 that is different from the lower printer 120 used with the previously described printer stands 140 and 240. In this embodiment, the support bar 362 is configured to engage the underside of the lower printer (e.g., the receipt printer 120 in this embodiment) in order to secure the printer stand 340 and reduce the likelihood of tipping the printer stand 340. For example, the support bar 362 prevents the printer stand 340 from tipping backwards when a store worker bumps into the printer stand while attempting to access a receipt output by the receipt printer 120 by anchoring the printer stand 340 between the receipt printer 120 and the integration tray 310. The weight of the receipt printer 120 helps to secure the printer stand 340 in place and prevent tipping of the printer stand 340.

In some embodiments, the printer stand 340 includes bottom support tabs 366a-b (FIGS. 5D-E) extending from lower edges 368a-b of the opposing side panels 342a-b for engaging grooves 316a-b (FIG. 5A) in the top surface of an integration tray 310. As previously described, the printer stand 340 is positioned on the integration tray 310 so as to support the coupon printer 130 in a vertical array with the receipt printer 120. The bottom support tabs 366a-b are configured to engage the grooves 316a-b of the integration tray 310 to secure the printer stand 340 in place relative to the integration tray 310 as described above for the printer stand 140. In the embodiment depicted, the lower edges 368a-b are shorter in length than the lower edges 168a-b of the printer stand 140 shown in FIG. 3A or the lower edges 268a-b of the printer stand 240 shown in FIG. 4A. In some such embodiments, the lower edges 368a-b of the printer stand 340 are configured to mate with integration trays having a shorter front to back length. In other such embodiments, the length of the lower edges 368a-b is set so as to be compatible with grooves 316a-b that are shorter in length than the grooves 116a-b shown in FIG. 3A or the grooves 216a-b shown in FIG. 4A. As one example, the lower edges 368a-b of the printer stand 340 are between 7 inches and 9 inches in length. As another example, the lower edges 368a-b are 8 and ⅛ inches in length. In the embodiment depicted in FIGS. 5A-5G, the bottom support tabs 366a-b are shorter in length than the lower edges 368a-b. As one example, the length of the bottom support tabs 366a-b is between 7 inches and 9 inches. As another example, the length of the bottom support tabs 366a-b is 7 and ⅝ inches. This allows the forward to back length of the printer stand 340 to be greater than the length of the grooves 316a-b of the integration tray 310.

Referring now to FIGS. 6A-6G, some alternative embodiments of a printer stand 440 are configured to engage with an integration tray 410 that is sloped while also engaging with a lower printer as described in connection with FIGS. 5A-G. In such embodiments, the printer stand 440 is optionally equipped with lower edges 468a-b that slope in a complementary manner relative to the slope of the integration tray 410, thereby allowing the printer stand to retain an upper printer 130 in a generally horizontal orientation.

Similar to previously described embodiments, the printer stand 440 includes opposing side panels 442a-b. The opposing side panels 442a-b are spaced apart so as to define a space for a lower printer (e.g. a receipt printer 120 in this embodiment) to be positioned between the opposing side panels 442a-b. The printer stand 440 includes a support tray 444 supported by and extending between the opposing side panels 442a-b for receiving an upper printer (e.g. a coupon printer 130 in this embodiment). The opposing side panels 442a-b extend in a vertical direction above the support tray 444 to form upper side walls 446a-b. The upper side walls 446a-b are adapted to hold the coupon printer 130 in position when the coupon printer 130 is supported by the support tray 444 and prevent the coupon printer 130 from tipping or sliding off of the support tray 444. The printer stand 440 additionally includes a rear panel 448 and a front lip 454 for holding the coupon printer 130 in place. In some embodiments, the front lip 454 has a height sufficient to allow a paper access door of the coupon printer 130 to be fully or partially opened to allow access to a paper roll or paper supply of the coupon printer 130 as described for the previous embodiment of the printer stand 140.

Similar to previously described embodiments, the upper side walls 446a-b include cutaway portions 450 to allow power and/or data cables of the coupon printer 130 to pass through the upper side walls 446a-b. In some embodiments, the cable concealing shaft 156 described above with reference to FIGS. 4A-4H is optionally attached to one of the opposing side panels 442a-b in order to generally conceal cables that are passed through one of the cutaway portions 450. Optionally, one or both of the side panels 442a-b includes a paper access window 458 that allows access to a side paper access door of the receipt printer 120. This allows a store worker to open the side paper access door and replace a printer roll or printer paper of the receipt printer 120. In some embodiments, the paper access window 458 is sufficiently sized to allow a store worker to pass one or more hands through the paper access window and open the side paper access door of the receipt printer 120. In the embodiment depicted, the paper access window 458 is larger than paper access windows depicted in previously described embodiments. As one example, the paper access window 458 is between 4 and 5 inches tall and between 4 and 5 inches wide. As another example, the paper access window 458 is approximately 4 and ½ inches tall and approximately 3 and 2/16 inches wide. The larger paper access window 458 is configured to accommodate bottom printers having larger side paper access doors. For example, the paper access window 458 is optionally configured to accommodate a side paper access door of a point-of-sale Receipt Printer supplied by IBM Corporation of Armonk, N.Y.

In some embodiments, the receipt printer 120 includes a front paper access door that opens in an upward direction and allows access to a paper roll or paper supply of the receipt printer 120. In such embodiments, the support tray 444 is optionally positioned at a sufficient height to allow the front paper access door to be opened wide enough to allow access to a paper roll or paper supply of the receipt printer 120. Similar to the previously described printer stand 340 shown in FIGS. 5A-5G, the printer stand 440 includes a rear bar 464 extending between the opposing side panels 442a-b near the base of the printer stand 440 for holding the printer stand 440 in position relative to the receipt printer 120. The rear bar 464 prevents the receipt printer 120 from sliding backwards with relation to the printer stand 440. In some instances, the rear bar 464 prevents the printer stand 440 from sliding forward with relation to the receipt printer 120 by contacting a rear surface of the receipt printer 120 and holding the printer stand 440 in place.

In some embodiments, the opposing side panels 442a-b include recessed front edges 452a and 452b, respectively. In the depicted embodiment, in contrast to some previously described embodiments, each of the recessed front edges 452a-b forms a generally rectangular shape having a long vertical portion and shorter, generally horizontal portions with the corners of the recessed front edges 452a-b being rounded. The rounded edges of the recessed front edges 452a-b help to prevent store workers or other users of the printer stand 440 from cutting themselves on sharp edges of the printer stand while attempting to access receipts output by the receipt printer 120. The linear vertical portion of each front edge 452a-b is positioned substantially behind vertical planes of the front faces of the receipt printer 120 and the coupon printer 130. In some embodiments, the vertical portions of the front edges 452a-b are located rearwardly of the front of the printer stand 140 so that a portion of each front edge 452a-b is positioned behind a portion of the lower printer (e.g., the receipt printer 120 in this embodiment). This allows side "hand swipe" access to a receipt output from the receipt printer 120. In some embodiments, the recessed front edges 452a-b have straight, vertical portions to allow the opposing side panels 442a-b to accommodate larger paper access windows 458. In such embodiments, the printer stand 440 requires a minimum level of support on either side of the paper access window 458. For example, the side panel 442b includes a vertical support portion 443 located between and defined by the vertical portion of the recessed front edge 452b and the paper access window 458. In some embodiments, the vertical support portion 443 is required to have a minimum width in order to provide adequate support for the printer stand 440 and the coupon printer 130. The vertical orientation of the vertical portion of the recessed front edge 452b allows the vertical support portion 443 to have a minimum required width while still allowing the side panel 442b to accommodate the paper access window 458.

Since both of the opposing side panels 442a-b include front edges 452a-b, the printer stand 440 allows side access of the receipt from both the left and right side, thus accommodating both right and left handed users. This also allows for the printer stand 440 to be placed on either the left or right side of a sales register, such as the point-of-sale register apparatus 100 shown in FIG. 1. In some embodiments, the front edges 452a-b are covered by edge guards 460a and 460b, respectively. In some embodiments, the edge guards 460a-b are linear members formed from rubber or plastic configured to fit over the vertical portions of the front edges 452a-b in order to prevent store workers or consumers from injuring themselves. For example, the edge guards 460a-b reduce the likelihood of store workers scraping or cutting themselves on the front edges 452a-b when accessing a receipt output by the receipt printer 120.

In some embodiments, the printer stand 440 includes bottom support tabs 466a-b (FIGS. 5D-E) extending from lower edges 468a-b of the opposing side panels 442a-b for engaging grooves 416a-b (FIG. 6A) in the top surface of an integration tray 410. As previously described, the printer stand 440 is positioned on the integration tray 410 so as to support the coupon printer 130 in a vertical array with the receipt printer 120. The bottom support tabs 466a-b are configured to engage the grooves 416a-b of the integration tray 410 to secure the printer stand 440 in place relative to the integration tray 410 as described above for the printer stand 140. In the embodiment depicted in FIGS. 6A-6G, in contrast to some previously described embodiments, the bottom support tabs 466a-b are positioned on the outsides of the opposing side panels 442a-b rather than on the inside of the opposing side panels 442a-b. In some embodiments, this configuration allows the printer stand 440 to engage an integration tray having grooves that are spaced further apart than the grooves of previously described embodiments. In other embodiments, this configuration allows the printer stand 440 to have a slightly smaller width in order to be more compatible with upper or lower printers having smaller widths.

In some embodiments, the top surface of the integration tray 410 is positioned at a sloping, non-horizontal angle. For example, the rear portion of the top surface of the integration tray 410 is higher than the front portion of the top surface of the integration tray 410 so that the top surface slopes downward from rear to front. In such embodiments, the lower edges 468a-b are configured to provide a complementary angle so that the support tray 444 is positioned in a generally horizontal orientation when the printer stand 440 is positioned on the integration tray 410. For example, if the front surface of the integration tray 410 is sloping downward at an angle of 15-degrees from horizontal, the lower edges 468a-b are similarly angled at 15-degrees from horizontal so that the support tray 444 is generally horizontal when the printer stand 440 is mounted on the integration tray 410. As such, the upper printer 130 rests on a generally horizontal plane even when the top surface of the integration tray 410 is in a non-horizontal position. In such embodiments, the grooves 416a-b in the integration tray 410 optionally include front and or rear walls to prevent the printer stand 440 from sliding off of the integration tray 410.

In contrast to previously described embodiments, the depicted embodiment of the printer stand 440 does not include a support bar configured to engage the underside of the lower printer. In this embodiment, the downward sloping orientation of the lower edges 468a-b reduces the likelihood of the printer stand 440 from tipping backwards when the printer stand 440 is accidentally bumped by a store worker or customer. Therefore, a support bar extending under the lower printer 120 is not employed in this embodiment.

Figure 7A:
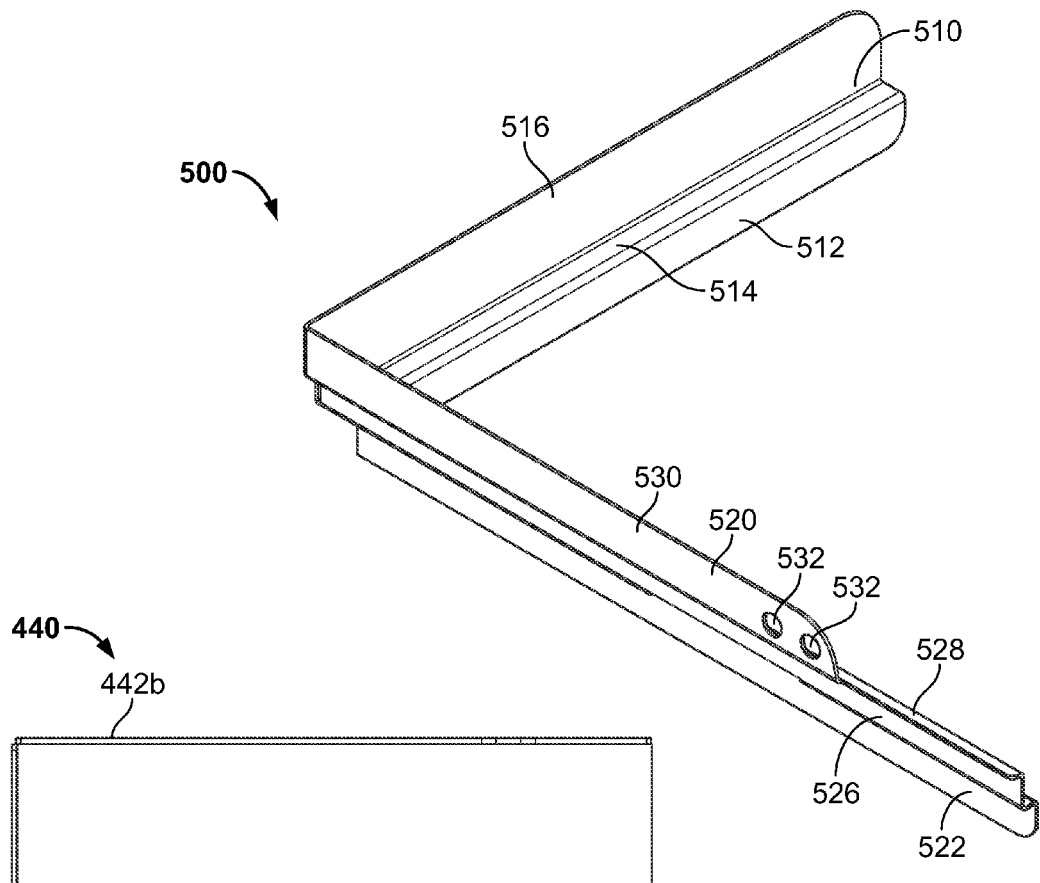
FIG. 7A is a perspective view of an adapter bracket for use with a printer stand, in accordance with some embodiments.
Figure 6G:
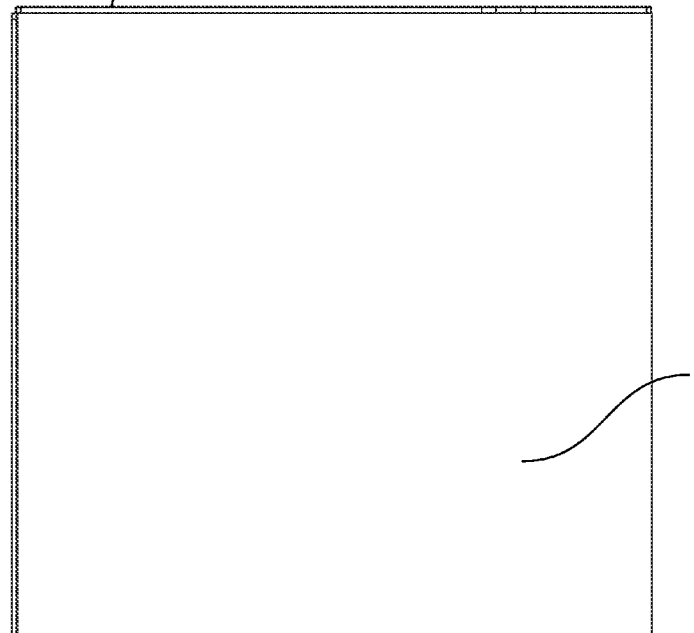
FIG. 6G is a bottom view of the printer stand of FIG. 6A.

Referring now to FIGS. 7A-7D, in some embodiments, an adapter bracket 500 is configured to couple to a printer stand to further anchor the printer stand to the integration tray. For example, adapter bracket 500 is configured to couple to the printer stand 440 shown in FIGS. 6A-6G. The adapter bracket 500 includes a first extending portion 510 for engaging the rear bar 464 of the printer stand 440. As shown in FIG. 7D, the first extending portion 510 forms a generally serpentine shape, having a first vertical portion 512 that engages a first horizontal portion 514 at a right angle. An opposing side of the first horizontal portion 514 engages a second vertical portion 516 at a right angle. The first and second vertical portions 512 and 516 along with the horizontal portion 514 form the first extending portion 510. A rear surface of the rear bar 464 of the printer stand 440 contacts the second vertical portion 516 when the adapter bracket 500 is coupled to the printer stand 440. The horizontal portion 514 supports the rear bar 464 by contacting a bottom surface of the rear bar 464.

The adapter bracket 500 includes a second extending portion 520 for engaging the lower edge 468b of the side panel 442b and the bottom support tab 466b. The second extending portion 520 forms a generally serpentine shape, having first, second, and third vertical portions 522, 526, and 530 connected by horizontal portions 524 and 528. In some embodiments, the vertical portion 530 engages a side of the bottom support tab 466b when the adapter bracket 500 is coupled to the printer stand 440. In some embodiments, the vertical portion 530 includes one or more apertures 532 for engaging one or more apertures 467 disposed through the bottom support tab 466b and the side panel 442b. In some embodiments, fasteners are inserted through the apertures 532 and 467 to couple the adapter bracket 500 to the bottom support tab 466b and the side panel 442b. In some embodiments, the horizontal portion 528 engages with and supports a bottom surface of the bottom support tab 466b when the adapter bracket 500 is coupled to the printer stand 440.

In some embodiments, the adapter bracket 500 is used to adapt a printer stand (e.g. the printer stand 440) to couple with a particular integration tray. For example, a size of a lower printer used in collaboration with the printer stand 440 has a width that is greater than the width of previously described lower printers. In this example, the opposing side panels 442a-b are spaced apart wider than opposing side panels in previously described embodiments in order to accommodate the larger width of the lower printer. The adapter bracket 500 allows the printer stand 440 to engage and an integration tray having grooves that are spaced apart less than the space between the opposing side panels 442a-b. In other embodiments, the adapter bracket 500 is used to adapt a standard sized printer stand to an integration tray having a smaller width dimension or having grooves that are placed closer together to each other on the top surface of the integration tray.

Referring now to FIGS. 8A-8D, some alternative embodiments of an adapter bracket 600 are configured to couple a different side of the printer stand 440 shown in FIGS. 6A-6G. In contrast to the adapter bracket 500 shown in FIGS. 7A-7D, the adapter bracket 600 is adapted to engage the rear bar 464 and the side panel 442a (rather than the side panel 442b) of the printer stand 440. The adapter bracket 600 includes a first extending portion 610 for engaging the rear bar 464 of the printer stand 440. As shown in FIG. 8D, the first extending portion 610 forms a generally serpentine shape, having a first vertical portion 612 that engages a first horizontal portion 614 at a right angle. An opposing side of the first horizontal portion 614 engages a second vertical portion 616 at a right angle. The first and second vertical portions 612 and 616 along with the horizontal portion 614 form the first extending portion 610. A rear surface of the rear bar 464 of the printer stand 440 contacts the second vertical portion 616 when the adapter bracket 600 is coupled to the printer stand 440. The horizontal portion 614 supports the rear bar 464 by contacting a bottom surface of the rear bar 464.

The adapter bracket 600 includes a second extending portion 620 for engaging the lower edge 468b of the side panel 442b and the bottom support tab 466b. The second extending portion 620 forms a generally serpentine shape, having first and second vertical portions 622 and 626 connected by a horizontal portion 624. The first and second vertical portions 622 and 626 engage the horizontal portion 624 at generally right angles. In some embodiments, the vertical portion 626 engages a side of the bottom support tab 466a when the adapter bracket 600 is coupled to the printer stand 440. In some embodiments, the vertical portion 626 includes one or more apertures 632 for engaging one or more apertures 469 disposed through the bottom support tab 466a and the side panel 442a. In some embodiments, fasteners are inserted through the apertures 632 and 469 to couple the adapter bracket 600 to the bottom support tab 466a and the side panel 442a. In some embodiments, the horizontal portion 624 engages with and supports a bottom surface of the bottom support tab 466a when the adapter bracket 600 is coupled to the printer stand 440.

In some embodiments, the adapter bracket 600 is used to adapt a printer stand (e.g. the printer stand 440) to couple with a particular integration tray. For example, a size of a lower printer used in collaboration with the printer stand 440 has a width that is greater than the width of previously described lower printers. In this example, the opposing side panels 442a-b are spaced apart wider than opposing side panels in previously described embodiments in order to accommodate the larger width of the lower printer. The adapter bracket 600 allows the printer stand 440 to engage and an integration tray having grooves that are spaced apart less than the space between the opposing side panels 442a-b. In other embodiments, the adapter bracket 600 is used to adapt a standard sized printer stand to an integration tray having a smaller width dimension or having grooves that are placed closer together to each other on the top surface of the integration tray.

A number of embodiments of the invention have been described. Nevertheless, it will be understood that various modifications may be made without departing from the spirit and scope of the invention. Accordingly, other embodiments are within the scope of the following claims.

What is claimed is:

1. A point-of-sale register apparatus, comprising:
a user input device to input information indicative of one or more products in a transaction, the input device being selected from a group consisting of a keyboard, a mouse, a credit card reader, an optical scanner, and a touch screen;
a display device to display transaction information from the transaction;
a coupon printer and a receipt printer each having a footprint width of less than about eight inches, at least one of the coupon printer and the receipt printer outputting a transaction document indicative of the transaction; and
a printer stand to support the coupon printer and the receipt printer in generally vertical alignment relative to the other, the printer stand including two opposing side panels coupled to an elevated support surface that define a lower cavity to receive one of the coupon printer and the receipt printer, and the printer stand including a plurality of retaining wall portions extending general vertically from the elevated support surface so that the other of the coupon printer and the receipt printer is supported on the elevated support surface between the retaining wall portions,
wherein the side panels of the printer stand include nonlinear front edges that at least initially recess rearwardly from the elevated support surface toward the lower cavity to at least partially define a lateral hand access path for lateral hand movements of a user, and wherein a paper output of the one of the coupon printer and the receipt printer in the lower cavity is disposed in the lateral hand access path defined by the non-linear front edges.

2. The apparatus of claim 1, wherein at least a portion of the non-linear front edges project rearwardly behind a front face of the one of the coupon printer and the receipt printer arranged in the lower cavity.

3. The apparatus of claim 1, wherein the retaining wall portions include cutaway notches on opposing sides of the elevated support surface to receive a power cable and a data cable of the one of the coupon printer and the receipt printer arranged on the elevated support surface.

4. The apparatus of claim 1, wherein the elevated support surface is arranged at a height above lower edges of the side panels to define a paper roll access space above the one of the coupon printer and the receipt printer arranged in the lower cavity.

5. The apparatus of claim 4, wherein the lower edges of opposing side panels extend non-parallel to the elevated support surface such that the lower edges of the opposing side panels extend non-horizontally when the elevated support surface is arranged in a generally horizontal configuration to support one of the coupon printer and the receipt printer.

6. The apparatus of claim 4, wherein the lower edges of opposing side panels extend generally parallel to the elevated support surface such that the lower edges of the opposing side panels extend generally horizontally when the elevated support surface is arranged in a generally horizontal configuration to support one of the coupon printer and the receipt printer.

7. The apparatus of claim 1, further comprising a computer processing portion having one or more microprocessors and computer-readable memory devices so as to operate a software program that processes and records the transaction, each of the user input device, the display device, the coupon printer, and the receipt printer being connected to the computer processing portion.

8. The apparatus of claim 7, further comprising a secondary display device connected to the computer processing portion, the secondary display device being positioned apart from the first display device.

9. The apparatus of claim 8, wherein the printer stand engages an upper surface of an integration tray of the computer processing portion.

10. The apparatus of claim 9, wherein the printer stand includes bottom support tabs extending from the lower edges so as to mate with corresponding grooves defined by the upper surface of the integration tray.

11. An in-store receipt printing apparatus for a point-of-sale register apparatus, comprising:
an upper printer arranged above a lower printer, one of the upper and lower printers outputting coupons during a transaction in which the other of the upper and lower printers outputs a transaction receipt; and
a printer support structure to retain the upper and lower printers in a vertical array, the printer support structure including:
an upper tray extending between opposing side walls to define a lower space in which the lower printer is received,
at least one lower anchor member extending from one or both of the opposing side walls so that the lower printer rests on the lower anchor member and secures the printer support structure in an operative position, and
retaining means for retaining the upper printer on the upper tray in generally vertical alignment with the lower printer, wherein the retaining means defines cutaway portions on opposing sides of the upper tray so as to receive one or both of a power cord and a data cable of the upper printer.

12. The apparatus of claim 11, wherein the retaining means comprises a rear panel positioned above a rear edge of the upper tray and a front lip positioned above a front edge of the upper tray, the rear panel and the front lip being operative to retain the upper printer on the upper tray.

13. The apparatus of claim 12, wherein the printer support structure further comprises a cable concealing shaft to receive and conceal one or both of the power cord and the data cable of the upper printer, wherein the cable concealing shaft is detachably coupled to one of the opposing side walls.

14. The apparatus of claim 11, wherein the opposing side walls of the printer support structure include recessed front edges to at least partially define a side access path to provide clearance for lateral hand movements of a user toward a paper output of the lower printer.

15. The apparatus of claim 14, wherein at least one of the opposing side walls of the printer support structure defines a paper access window to provide side access to a paper access door of the lower printer.

16. The apparatus of claim 11, wherein the upper and lower printers are connected to a computer processing portion, the apparatus further comprising: primary and secondary display devices connected to the computer processing portion, and a user input device connected to the computer processing portion and selected from a group consisting of a keyboard, a mouse, a credit card reader, an optical scanner, and a touch screen.

17. A point-of-sale printing apparatus, comprising:
a first printer arranged in vertical alignment with a second printer, one of the first and second printers outputting at least one coupon during a transaction in which the other of the first and second printers outputs a transaction receipt; and a printer rack device for supporting the first and second printers in generally vertical alignment with one another, wherein the printer rack device includes opposing side panels extending generally vertically from lower edges, an upper support surface extending between the opposing side panels to support the first printer in vertical alignment above the second printer, wherein the second printer is positioned in a lower cavity that is at least partially defined under the upper support surface and between the opposing side panels, and an integration tray on which the lower cavity is supported, wherein the integration tray includes alignment structure for alignment of either a bottom support surface on which the second printer is supported or the second printer, wherein the lower edges of opposing side panels extend non-parallel to the upper tray such that the lower edges of the opposing side panels extend non-horizontally when the upper tray is arranged in a horizontal configuration to support the upper printer.

18. The apparatus of claim 17, wherein the opposing side panels of the printer rack device include curved front edges that bow rearwardly and at least partially define a lateral hand swipe path to provide clearance for lateral hand movements of a user toward a paper output of the second printer.

19. The apparatus of claim 17, wherein both of the opposing side panels extend vertically above the upper support surface and define a slot or aperture adjacent to the upper tray so as to receive one or both of a power cord and a data cable of the first printer.

20. The apparatus of claim 19, wherein the printer rack device further comprises a rear panel positioned above a rear edge of the upper tray and a front lip positioned above a front edge of the upper tray, the rear panel and the front lip being operative to retain the first printer on the upper tray.

* * * * *